United States Patent
Jing et al.

(10) Patent No.: US 11,535,721 B2
(45) Date of Patent: *Dec. 27, 2022

(54) FILMS WITH A PRIMER LAYER CONTAINING COMPOSITE PARTICLES THAT INCLUDE AN ORGANIC POLYMER PORTION AND A SILICEOUS PORTION

(71) Applicant: 3M INNOVATIVE PROPERTIES COMPANY, St. Paul, MN (US)

(72) Inventors: Naiyong Jing, St. Paul, MN (US); Xue Tian, Woodbury, MN (US); Jun Ma, Woodbury, MN (US); Garry W. Lachmansingh, Plymouth, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 542 days.

This patent is subject to a terminal disclaimer.

(21) Appl. No.: 16/619,363

(22) PCT Filed: Jun. 7, 2018

(86) PCT No.: PCT/US2018/036435
§ 371 (c)(1),
(2) Date: Dec. 4, 2019

(87) PCT Pub. No.: WO2018/236593
PCT Pub. Date: Dec. 27, 2018

(65) Prior Publication Data
US 2020/0157302 A1    May 21, 2020

Related U.S. Application Data

(60) Provisional application No. 62/523,984, filed on Jun. 23, 2017.

(51) Int. Cl.
| | |
|---|---|
| C08J 7/06 | (2006.01) |
| C08K 3/08 | (2006.01) |
| C08K 3/36 | (2006.01) |
| C08K 9/02 | (2006.01) |
| C08K 9/08 | (2006.01) |
| C08J 7/04 | (2020.01) |
| C08K 5/5415 | (2006.01) |
| C08J 7/043 | (2020.01) |
| C08J 7/046 | (2020.01) |
| C08J 7/056 | (2020.01) |

(52) U.S. Cl.
CPC ........... C08J 7/06 (2013.01); C08J 7/043 (2020.01); C08J 7/046 (2020.01); C08J 7/0423 (2020.01); C08J 7/0427 (2020.01); C08J 7/056 (2020.01); C08K 3/08 (2013.01); C08K 3/36 (2013.01); C08K 5/5415 (2013.01); C08K 9/02 (2013.01); C08K 9/08 (2013.01); C08J 2367/00 (2013.01); C08J 2483/04 (2013.01); C08K 2201/003 (2013.01)

(58) Field of Classification Search
None
See application file for complete search history.

(56) References Cited

U.S. PATENT DOCUMENTS

| | | |
|---|---|---|
| 2,736,721 A | 2/1956 | Dexter |
| 2,803,615 A | 8/1957 | Ahlbrecht |
| RE24,906 E | 12/1960 | Ulrich |
| 4,152,165 A | 5/1979 | Langager |
| 4,235,638 A | 11/1980 | Beck |
| 4,338,377 A | 7/1982 | Beck |
| 4,806,665 A | 2/1989 | Jones |
| 4,816,333 A | 3/1989 | Lange |
| 4,830,773 A | 5/1989 | Olson |
| 4,833,179 A | 5/1989 | Young |
| 5,209,971 A | 5/1993 | Babu |
| 5,244,780 A | 9/1993 | Strobel |
| 5,461,134 A | 10/1995 | Leir |
| 5,824,748 A | 10/1998 | Kesti |
| 5,882,774 A | 3/1999 | Jonza |
| 5,936,703 A | 8/1999 | Miyazaki |
| 6,040,053 A | 3/2000 | Scholz |
| 6,372,323 B1 | 4/2002 | Kobe |

(Continued)

FOREIGN PATENT DOCUMENTS

| | | |
|---|---|---|
| EP | 2674449 | 12/2013 |
| WO | WO 1995-17303 | 6/1995 |

(Continued)

OTHER PUBLICATIONS

"Zwitterionic compounds/zwitterions", International Union of Pure and Applied Chemistry (IUPAC) Gold Book, [retrieved from the internet on Jan. 21, 2020], URL <http://goldbook.iupac.org/Z06752.html.>, 1 page.
Bragg, "The Form Birefringence of Marcomolecules", Acta Crystallographica, 1953, vol. 6, pp. 865-867.
Encyclopedia of Polymer Science and Engineering, 1988, vol. 13, 3 pages.
Encyclopedia of Polymer Science and Technology, 1972, vol. 1, 24 pages.
Kirk-Othmer, Encyclopedia of Chemical Technology, 900-912 (1979).
Koppel, "Analysis of Macromolecular Polydispersity in Intensity Correlation Spectroscopy: The Method of Cumulants", Journal of Chemical Physics, Dec. 1972, vol. 57, No. 11, pp. 4814-4820.

(Continued)

Primary Examiner — Sheeba Ahmed
(74) Attorney, Agent, or Firm — Jean A. Lown

(57) ABSTRACT

A film including: an organic polymeric substrate having a first major surface and a second major surface; an optional acrylic hardcoat layer disposed on the first major surface of the substrate; a siliceous primer layer disposed on the organic polymeric substrate or on the optional acrylic hardcoat layer, wherein the siliceous primer layer includes composite particles including an organic polymer portion and a siliceous portion; and a superhydrophilic surface layer disposed on the siliceous primer layer, wherein the superhydrophilic surface layer includes hydrophilic-functional groups.

20 Claims, 1 Drawing Sheet

(56) References Cited

U.S. PATENT DOCUMENTS

| | | |
|---|---|---|
| 6,375,871 B1 | 4/2002 | Bentsen |
| 6,696,157 B1 | 2/2004 | David |
| 6,916,773 B2 | 7/2005 | Griese |
| 6,991,695 B2 | 1/2006 | Tait |
| 7,099,083 B2 | 8/2006 | Johnson |
| 7,371,464 B2 | 5/2008 | Sherman |
| 8,772,215 B2 | 7/2014 | Ryther |
| 9,340,683 B2 | 5/2016 | Jing |
| 11,384,212 B2 * | 7/2022 | Tian .................. C08J 7/056 |
| 2003/0134515 A1 | 7/2003 | David |
| 2005/0064275 A1 | 3/2005 | Mekala |
| 2005/0106360 A1 | 5/2005 | Johnston |
| 2007/0139451 A1 | 6/2007 | Somasiri |
| 2010/0317559 A1 | 12/2010 | Ryther |
| 2012/0273000 A1 | 11/2012 | Jing |
| 2012/0295829 A1 | 11/2012 | Peitersen |
| 2013/0023458 A1 | 1/2013 | Hodge |
| 2016/0271997 A1 | 9/2016 | Berniard |

FOREIGN PATENT DOCUMENTS

| | | |
|---|---|---|
| WO | WO 1996-34029 | 10/1996 |
| WO | WO 1996-35458 | 11/1996 |
| WO | WO 1999-36248 | 7/1999 |
| WO | WO 1999-39224 | 8/1999 |
| WO | WO 2007-146680 | 12/2007 |
| WO | WO 2009-119690 | 10/2009 |
| WO | WO 2009-140482 | 11/2009 |
| WO | WO 2011-084661 | 7/2011 |
| WO | WO 2011-163175 | 12/2011 |
| WO | WO 2013-102099 | 7/2013 |
| WO | WO 2015-164468 | 10/2015 |
| WO | WO 2016-044082 | 3/2016 |
| WO | WO 2017-107184 | 6/2017 |
| WO | WO 2017-107185 | 6/2017 |
| WO | WO 2018-234916 | 12/2018 |

OTHER PUBLICATIONS

Litt, "Siloxane Zwitterions: Synthesis and Surface Properties of Crosslinked Polymers", Journal of Applied Polymer Science, May 1975, vol. 19, No. 5, pp. 1221-1225.

Pujari, "Covalent Surface Modification of Oxide Surfaces", Angewandte Chemie International Edition, 2014, vol. 53, pp. 6322-6356.

Qui, "Development and evaluation of new zwitterionic Hydrophilic interaction liquid chromatography stationary phases based on 3-P,P-diphenylphosphonium-propylsulfonate", Journal of Chromatography A, 2011, vol. 1218, pp. 8075-8082.

International Search Report for PCT International Application No. PCT/US2018/036435, dated Sep. 13, 2018, 5 pages.

* cited by examiner

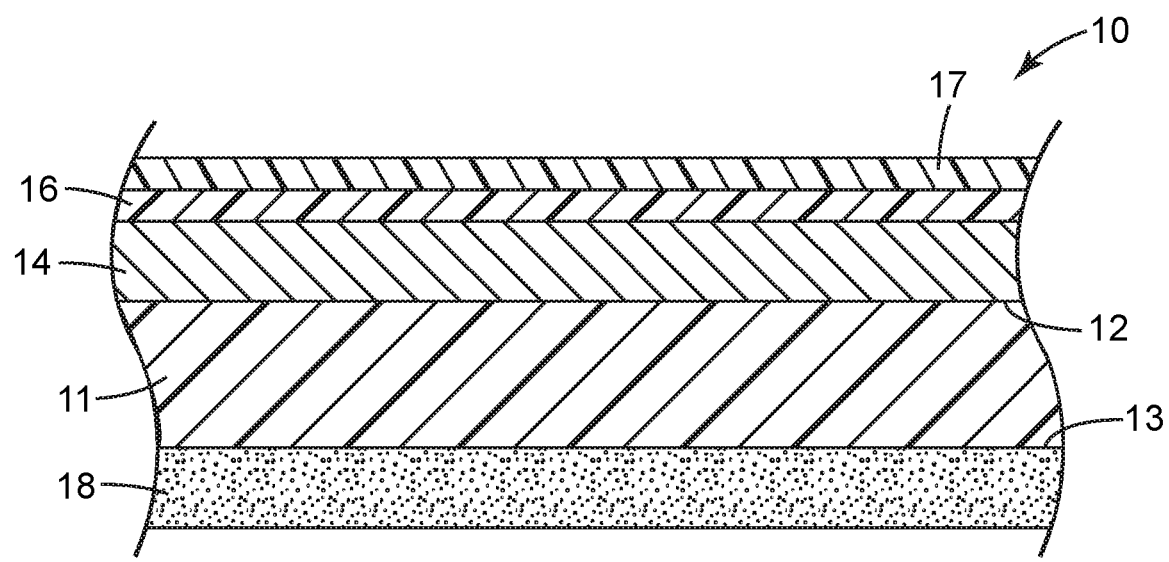

FILMS WITH A PRIMER LAYER CONTAINING COMPOSITE PARTICLES THAT INCLUDE AN ORGANIC POLYMER PORTION AND A SILICEOUS PORTION

CROSS REFERENCE TO RELATED APPLICATION

This application is a national stage filing under 35 U.S.C. 371 of PCT/US2018/036435, filed Jun. 7, 2018, claims the benefit of U.S. Provisional Patent Application No. 62/523,984, filed Jun. 23, 2017, the disclosure of which is incorporated by reference herein in its entirety.

BACKGROUND

The ability to control the surface wettability of solid substrates is important for various applications. Highly hydrophilic surfaces (i.e., superhydrophilic surfaces) are known to provide antifogging, easy-clean, and rinse-away properties by allowing water to rapidly spread into a continuous and even water sheet on the surface, thus undercutting and lifting off various contaminants, which are typically hydrophobic. A use for this is on white boards. For example, superhydrophilic surfaces with easy-removal of permanent markers are useful for easy-clean white boards.

For application to a variety of substrates, it is desirable to coat compositions that provide such superhydrophilic surfaces on a polymeric sheet (e.g., a flexible organic polymeric substrate such as polyethylene terephthalate (PET)). The development of durable hydrophilic coatings on such organic polymeric substrates is challenging due to the poor interfacial adhesion between the dissimilar hydrophilic coating materials and hydrophobic substrates. Thus, such hydrophilic protective coatings on hydrophobic substrates are temporary and short-lived. Durability has been increased by using a hardcoat layer with additional treatment (e.g., corona treatment, plasma treatment, or a diamond like glass layer). The preparation of such films, however, involves multi-step processes at high cost. What is needed is a durable film construction with a superhydrophilic surface that can be made efficiently at lower cost.

SUMMARY

The present disclosure provides a film construction having a superhydrophilic surface layer. Specifically, a film is provided that includes: an organic polymeric substrate having a first major surface and a second major surface; an optional acrylic hardcoat layer disposed on the first major surface of the substrate; a siliceous primer layer disposed on the organic polymeric substrate or on the optional acrylic hardcoat layer; and a superhydrophilic surface layer disposed on the siliceous primer layer, wherein the superhydrophilic surface layer includes hydrophilic-functional (e.g., sulfonate-functional) groups. The use of the siliceous primer layer results in the production of a film at lower cost using, for example, conventional techniques, such as roller coating techniques.

The siliceous primer layer includes composite particles including an organic polymer portion and a siliceous portion. In certain embodiments, the composite particles include organic polymer core particles having a siliceous shell thereon. In certain embodiments, the siliceous shell includes a silicate coating. In certain embodiments, the siliceous portion includes silica particles, such as organo-modified silica particles or unmodified nonporous spherical silica particles.

The terms "polymer" and "polymeric material" include, but are not limited to, organic homopolymers, copolymers, such as for example, block, graft, random, and copolymers, terpolymers, etc., and blends and modifications thereof. Furthermore, unless otherwise specifically limited, the term "polymer" shall include all possible geometrical configurations of the material. These configurations include, but are not limited to, isotactic, syndiotactic, and atactic symmetries.

Herein, the term "comprises" and variations thereof do not have a limiting meaning where these terms appear in the description and claims. Such terms will be understood to imply the inclusion of a stated step or element or group of steps or elements but not the exclusion of any other step or element or group of steps or elements. By "consisting of" is meant including, and limited to, whatever follows the phrase "consisting of." Thus, the phrase "consisting of" indicates that the listed elements are required or mandatory, and that no other elements may be present. By "consisting essentially of" is meant including any elements listed after the phrase, and limited to other elements that do not interfere with or contribute to the activity or action specified in the disclosure for the listed elements. Thus, the phrase "consisting essentially of" indicates that the listed elements are required or mandatory, but that other elements are optional and may or may not be present depending upon whether or not they materially affect the activity or action of the listed elements.

The words "preferred" and "preferably" refer to embodiments of the disclosure that may afford certain benefits, under certain circumstances. However, other embodiments may also be preferred, under the same or other circumstances. Furthermore, the recitation of one or more preferred embodiments does not imply that other embodiments are not useful, and is not intended to exclude other embodiments from the scope of the disclosure.

In this application, terms such as "a," "an," and "the" are not intended to refer to only a singular entity, but include the general class of which a specific example may be used for illustration. The terms "a," "an," and "the" are used interchangeably with the term "at least one." The phrases "at least one of" and "comprises at least one of" followed by a list refers to any one of the items in the list and any combination of two or more items in the list.

As used herein, the term "or" is generally employed in its usual sense including "and/or" unless the content clearly dictates otherwise.

The term "and/or" means one or all the listed elements or a combination of any two or more of the listed elements.

Also, herein, all numbers are assumed to be modified by the term "about" and in certain embodiments, preferably, by the term "exactly." As used herein in connection with a measured quantity, the term "about" refers to that variation in the measured quantity as would be expected by the skilled artisan making the measurement and exercising a level of care commensurate with the objective of the measurement and the precision of the measuring equipment used. Herein, "up to" a number (e.g., up to 50) includes the number (e.g., 50).

Also, herein, the recitations of numerical ranges by endpoints include all numbers subsumed within that range as well as the endpoints (e.g., 1 to 5 includes 1, 1.5, 2, 2.75, 3, 3.80, 4, 5, etc.).

As used herein, the term "room temperature" refers to a temperature of 20° C. to 25° C., or in certain embodiments, 22° C. to 25° C.

The term "in the range" or "within a range" (and similar statements) includes the endpoints of the stated range.

Groupings of alternative elements or embodiments disclosed herein are not to be construed as limitations. Each group member may be referred to and claimed individually or in any combination with other members of the group or other elements found therein. It is anticipated that one or more members of a group may be included in, or deleted from, a group for reasons of convenience and/or patentability. When any such inclusion or deletion occurs, the specification is herein deemed to contain the group as modified thus fulfilling the written description of all Markush groups used in the appended claims.

Reference throughout this specification to "one embodiment," "an embodiment," "certain embodiments," or "some embodiments," etc., means that a particular feature, configuration, composition, or characteristic described in connection with the embodiment is included in at least one embodiment of the invention. Thus, the appearances of such phrases in various places throughout this specification are not necessarily referring to the same embodiment of the invention. Furthermore, the particular features, configurations, compositions, or characteristics may be combined in any suitable manner in one or more embodiments.

The above summary of the present disclosure is not intended to describe each disclosed embodiment or every implementation of the present invention. The description that follows more particularly exemplifies illustrative embodiments. In several places throughout the application, guidance is provided through lists of examples, which examples may be used in various combinations. In each instance, the recited list serves only as a representative group and should not be interpreted as an exclusive list.

BRIEF DESCRIPTION OF THE DRAWING

FIG. 1 is a cross-sectional representation of an exemplary film construction having a primer layer of the present disclosure (wherein the layers are not necessarily to scale).

DETAILED DESCRIPTION OF ILLUSTRATIVE EMBODIMENTS

The present disclosure provides (as shown in FIG. 1) a superhydrophilic film construction (10) that includes: an organic polymeric substrate (11) having a first major surface (12) and a second major surface (13); an optional acrylic hardcoat layer (14) disposed on the first major surface (12) of the substrate (11); a siliceous primer layer (16) disposed on the organic polymeric substrate (11) (e.g., on the first major surface (12)) or on the optional acrylic hardcoat layer (14)); and a superhydrophilic surface layer (17) disposed on the siliceous primer layer (16), wherein the superhydrophilic surface layer includes hydrophilic-functional groups.

Such superhydrophilic film constructions (10) typically include an adhesive layer (18) on the second major surface (13) of the substrate (11). There is no limitation on the type of adhesive other than for the desired end uses. Exemplary adhesives are pressure sensitive adhesives. Pressure sensitive adhesives useful on the films of the present disclosure can be self-tacky or require the addition of a tackifier. Such materials include, but are not limited to, tackified natural rubbers, tackified synthetic rubbers, tackified styrene block copolymers, self-tacky or tackified acrylate or methacrylate copolymers, self-tacky or tackified poly-a-olefins, and tackified silicones. Examples of suitable pressure sensitive adhesives are described in U.S. Pat. No. Re 24,906 (Ulrich), U.S. Pat. No. 4,833,179 (Young et al.), U.S. Pat. No. 5,209,971 (Babu et al.), U.S. Pat. No. 2,736,721 (Dexter), and U.S. Pat. No. 5,461,134 (Leir et al.), U.S. Pat. No. 7,371,464 (Sherman et al.), and International Publication Nos. WO 96/34029 (Sherman et al.) and 96/35458 (Melancon et al.), for example. Others are described in the Encyclopedia of Polymer Science and Engineering, vol. 13, Wiley-Interscience Publishers, NY, 1988, and the Encyclopedia of Polymer Science and Technology, Vol. 1, Interscience Publishers, NY, 1964.

The superhydrophilic surfaces of films of the present disclosure are capable of being written on with ink from a "permanent" marker and capable of being easily cleaned. Preferably, the films are "durable and ghost free" with no obvious permanent ink residue after being subjected to the Wet and/or Dry Abrasion Test Methods described in the Examples Section.

Permanent markers can have many of the same solvents as dry erase markers; however, permanent markers are generally "waterproof" after evaporation of the solvent due to the other components of the permanent markers and are not dry erasable.

Organic Polymeric Substrate

A variety of substrates that include an organic polymer can be used herein. The entire substrate may be made of an organic polymer, or the substrate may have a surface of such organic polymer. Whether just on a surface of a substrate or forming the entire substrate, the organic polymers are more hydrophobic than the superhydrophilic surface. Such organic substrates have a static contact angle of water that is greater than 15°.

Substrates used herein may be of a variety of constructions. For example, a substrate may be flat (e.g., sheet material), curved, or of a complex shape. A substrate may be a polymeric sheet material or a molded article.

Substrates used herein may be opaque or transparent or translucent to visible light. They may be flexible or inflexible. Preferably, the substrate is flexible. For example, a substrate may be a flexible sheet made, for example, using conventional filmmaking techniques such as extrusion of the substrate resin into a sheet and optional uniaxial or biaxial orientation. A typical flexible sheet material has a thickness of at least 25 micrometers (microns) and/or up to 1.25 millimeters (mm).

Illustrative examples of suitable (hydrophobic) substrates include organic polymers such as polyesters (such as polyethylene terephthalate, polybutyleneterephthalate), polycarbonates, allyldiglycolcarbonate, polyacrylates (such as polymethylmethacrylate), polystyrenes, polyvinyl chlorides, polysulfones, polyethersulfones, polyphenylethersulfones, homo-epoxy polymers, epoxy addition polymers with polydiamines or polydithiols, polyolefins (polypropylene, polyethylene, and polyethylene copolymers), fluorinated polymers (such as tetrafluoroethylene/hexafluoropropylene/vinylidene fluoride terpolymer, polyvinylidene fluoride, and polyvinyl fluoride), and cellulose esters (such as cellulose acetates or cellulose butyrates); and combinations thereof, including blends and laminates thereof. A preferred substrate is made of polyethylene terephthalate.

Illustrative examples of other suitable (more hydrophilic) substrates include organic polymers such as poly(N-isopropylacrylamide) and copolymers (such as poly(N-isopropylacrylamide-co-butylacrylate) and poly(N-isopropylacrylamide-co-methacrylic acid)), polyacrylamide and copolymers (such as poly(acrylamide-co-acrylic acid)), poly(-oxazoline) (such as poly(-methyl-2-oxazoline) and poly(-ethyl-2-oxazoline)), nylon, poly(acrylic acid) and copolymers (such as poly(acrylic acid-co-maleic acid)), poly(methacrylic acid) copolymers (such as poly(N-isopropylacrylamide-co-methacrylic acid)), polymethacrylates (such as poly(-hydroxypropyl methacrylate)), poly(ethylene glycol) and copolymers (such as polyethylene-block-poly(ethylene glycol) and poly(ethylene glycol)-block-poly(propylene glycol)-block-poly(ethylene glycol)), poly(vinyl alcohol) and copolymers (such as poly(vinyl alcohol-co-ethylene)), poly(vinyl pyrrolidinone) and copolymers (such as poly(1-vinylpyrrolidone-co-styrene) and poly(1-vinylpyrrolidone-co-vinyl acetate)), maleic anhydride copolymers (such as poly(ethylene-alt-maleic anhydride)), polyether (such as poly(methyl vinyl ether)) and copolymers (such as poly(methyl vinyl ether-alt-maleic acid)).

Substrates may be treated to improve adhesion to an overlying coating, using, e.g., chemical treatment, corona treatment such as air or nitrogen corona, plasma, flame, or actinic radiation.

Substrates may be provided with graphics, such as words or symbols as known in the art.

In some embodiments, the substrate is substantially self-supporting, i.e., sufficiently dimensionally stable to hold its shape as it is moved, used, and otherwise manipulated. In some embodiments, the substrate is supported in some fashion, e.g., with a reinforcing frame, adhered to a supporting surface, etc.

Optional Acrylic Hardcoat

An acrylic hardcoat (referred to herein as the "hardcoat" or "hardcoat layer") can improve the stiffness, dimensional stability, and durability of a film of the present disclosure.

In certain embodiments, the acrylic hardcoat is siloxane-bondable, i.e., capable of forming siloxane bonds with the siliceous primer layer. In such embodiments, prior to bonding to the siliceous primer layer, the acrylic hardcoat includes alkoxysilyl functionality.

The amount of alkoxysilyl-functional monomeric units in a cured acrylic hardcoat layer is at least 1 percent by weight (1 wt-%), or at least 5 wt-%, based on the total weight of the hardcoat layer. The amount of alkoxysilyl-functional monomeric units in a cured acrylic hardcoat layer is up to 30 wt-%, or up to 25 wt-%, based on the total weight the hardcoat layer.

The hardcoat is the reaction product of one or more polymerizable monomers, oligomers and/or polymers. In some embodiments, the hardcoat layer further includes particles or nanoparticles.

Preferably, the polymerizable material comprises a free-radically polymerizable material, such as one or more multifunctional (meth)acrylate monomers and/or oligomers. In certain embodiments, the hardcoat includes the reaction product of a mixture including at least one curable component selected from the group consisting of (meth)acrylate monomers and (meth)acrylate oligomers. The (meth)acrylate monomers/oligomers include multifunctional (meth)acrylates. Acrylate functional groups tend to be favored over (meth)acrylate functional groups.

Suitable multifunctional (meth)acrylates (i.e., crosslinking (meth)acrylate monomers) often contain at least two (meth)acryloyl groups, which are often acryloyl groups. Exemplary such monomers with two (meth)acryloyl groups include 1,2-ethanediol diacrylate, 1,3-propanediol diacrylate, 1,4-butanediol diacrylate, 1,6-hexanediol diacrylate (HDDA), 1,6-hexanediol monoacrylate monomethacrylate, 1,9-nonanediol diacrylate, 1,12-dodecanediol diacrylate, 1,3-butylene glycol diacrylate, bisphenol A diacrylate, diethylene glycol diacrylate, triethylene glycol diacrylate, tetraethylene glycol diacrylate, tripropylene glycol diacrylate, polyethylene glycol diacrylate, polypropylene glycol diacrylate, polyethylene/polypropylene copolymer diacrylate, and neopentylglycol hydroxypivalate diacrylate modified caprolactone.

Other di(meth)acryl-containing monomers include alkoxylated aliphatic diacrylate, alkoxylated cyclohexane dimethanol diacrylate, alkoxylated hexanediol diacrylate, alkoxylated neopentyl glycol diacrylate, cyclohexanedimethanol diacrylate, ethoxylated bisphenol A diacrylate, hydroxypivalaldehyde modified trimethylolpropane diacrylate, neopentyl glycol diacrylate, propoxylated neopentyl glycol diacrylate, tricyclodecanedimethanol diacrylate.

Exemplary crosslinking monomers with three or four (meth)acryloyl groups include, but are not limited to, trimethylolpropane triacrylate (e.g., commercially available under the tradename TMPTA-N from Cytec Surface Specialties, Smyrna, Ga. and under the tradename SR-351H from Sartomer, Exton, Pa.), pentaerythritol triacrylate (e.g., commercially available under the tradename SR-444 from Sartomer), tris(2-hydroxyethyl)isocyanurate triacrylate (e.g., commercially available under the tradename SR-368 from Sartomer), a mixture of pentaerythritol triacrylate and pentaerythritol tetraacrylate (e.g., commercially available from Cytec Surface Specialties under the tradename PETIA with an approximately 1:1 ratio of tetraacrylate to triacrylate, and under the tradename PETA-K with an approximately 3:1 ratio of tetraacrylate to triacrylate), glycerol triacrylate, ethoxylated triacrylates (e.g., ethoxylated trimethylolpropane triacrylate such as that commercially available from Sartomer Company, Exton, Pa. under the tradename SR-454), propoxylated triacrylates (e.g., propoxylated glyceryl triacrylate, propoxylated trimethylolpropane triacrylate), dipentaerythritol pentaacrylate (e.g., commercially available under the tradename SR-399 from Sartomer), pentaerythritol tetraacrylate (e.g., commercially available under the tradename SR-295 from Sartomer), di-trimethylolpropane tetraacrylate (e.g., commercially available under the tradename SR-355 from Sartomer), ethoxylated pentaerythritol tetraacrylate (e.g., commercially available under the tradename SR-494 from Sartomer), and caprolactone-modified dipentaerythritol hexaacrylate. Oligomeric (meth)acryl monomers such as, for example, urethane acrylates, polyester acrylates, and epoxy acrylates can also be employed.

In certain embodiments, the free-radically polymerizable monomers and/or oligomers include at least 10 wt-% multifunctional (meth)acrylate monomers and/or oligomers, based on the total weight of the polymerizable material (i.e., polymerizable monomers and/or oligomers).

In certain embodiments, the free-radically polymerizable monomers and/or oligomers include up to 100 wt-% multifunctional (meth)acrylate monomers and/or oligomers, based on the total weight of the polymerizable material (i.e., polymerizable monomers and/or oligomers).

Many of these monomers and oligomers can be characterized as having a high glass transition temperature (Tg), meaning that the homopolymer of such monomers or oligomers generally have a glass transition temperature of at least 40° C., at least 50° C., at least 60° C., at least 70° C., at least 80° C., at least 90° C., or at least 100° C. Examples of such high Tg monomers and oligomers include trimethylolpropane triacrylate (commercially available under the tradename TMPTA-N from Cytec Surface Specialties, Smyrna, Ga. and under the tradename SR-351H from Sartomer, Exton, Pa., Tg=62° C.), pentaerythritol triacrylate (commercially available under the tradename SR-444 from Sartomer, Tg=103° C.), tris(2-hydroxyethyl)isocyanurate triacrylate (commercially available under the tradename SR-368 from Sartomer, Tg=272° C.), di-trimethylolpropane tetraacrylate (commercially available under the tradename SR-355 from Sartomer, Tg=98° C.), dipentaerythritol pentaacrylate (commercially available under the tradename SR-399 from Sartomer, Tg=90° C.), and pentaerythritol tetraacrylate (commercially available under the tradename SR-295 from Sartomer, Tg=103° C.). Combinations of high Tg monomers/oligomers may be used if desired.

In some embodiments, the hardcoat may include 0 wt-%, at least 5 wt-%, at least 25 wt-%, or at least 50 wt-%, and typically up to 100 wt-%, of high Tg monomers or oligomers, based on the total weight of the (meth)acrylate monomers and/or oligomers.

In some embodiments, the hardcoat may include at least 5 wt-%, at least 10 wt-%, at least 15 wt-%, or at least 20 wt-%, and typically up to 30 wt-%, of low Tg monomers or oligomers, based on the total weight of the (meth)acrylate monomers and/or oligomers. In this context, low Tg means that the homopolymer of such monomers or oligomers generally has a Tg of less than 25° C., or less than 0° C. Various, low Tg monomers and oligomer are known.

Examples of such low Tg monomers and oligomers include ethoxylated(20) trimethylolpropane triacrylate (commercially available under the tradename SR-415 from Sartomer, Tg=−40° C.), ethoxylated(15) trimethylolpropane triacrylate (commercially available under the tradename SR-9035 from Sartomer, Tg=−32° C.), 2(2-ethoxyethoxy)ethyl acrylate (commercially available under the tradename SR-256 from Sartomer, Tg=−54° C.), polyethylene glycol (400) diacrylate (commercially available under the tradename SR-344 from Sartomer, Tg=−24.6° C.), polyethylene glycol(600) dimethacrylate (commercially available under the tradename SR-252 from Sartomer, Tg=−38.8° C.), methoxy polyethylene glycol(350) monomethacrylate (commercially available under the tradename SR-550 from Sartomer, Tg=−62° C.), propoxylated glyceryl triacrylate (commercially available under the tradename SR-9020 from Sartomer, Tg=18° C.), and ethoxylated pentaerythritol tetraacrylate (commercially available under the tradename SR-494 from Sartomer, Tg=2° C.). Various combinations of low Tg monomers/oligomers may be used, if desired.

The hardcoat composition used to prepare the hardcoat layer typically includes a sufficient amount of high Tg polymerizable materials (and optional nanoparticles or other particles) such that the hardcoat layer is non-tacky and has a Tg well above room temperature. In typical embodiments, the Tg of the hardcoat layer is at least 40° C., at least 50° C., at least 60° C., at least 70° C., at least 80° C., at least 90° C., or at least 100° C.

The hardcoat composition used to prepare the hardcoat layer also includes polymerizable alkoxysilyl-containing ethylenically unsaturated monomers for anchoring the primer layer. Examples of such monomers include those of the following general Formulas (I), (II), and (III):

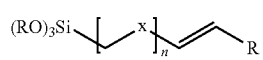

(I)

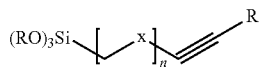

(II)

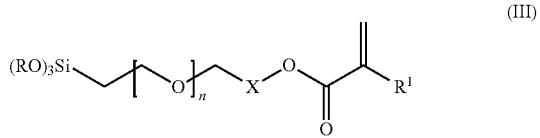

(III)

wherein for Formulas (I) and (II):
each R is independently H, —CH$_3$, —C$_2$H$_5$, —C$_3$H$_7$, or —C$_4$H$_9$;
X=CH$_2$ or O; and
n=0 to 10;
wherein for Formula (III):
each R is independently H, —CH$_3$, —C$_2$H$_5$, —C$_3$H$_7$, or —C$_4$H$_9$;
R$^1$ is —CH$_3$ or H;
X=CH$_2$, O, S, or NHC(O)R$^2$;
R$^2$ is independently —C$_2$H$_5$, —C$_3$H$_7$, or —C$_4$H$_9$; and
n=0 to 10.

Examples of suitable polymerizable alkoxysilyl-functional (meth)acrylates include 3-(methacryloyloxy)propyl trimethoxysilane (i.e., 3-(trimethoxysilyl)propyl methacrylate, available under the tradename SILQUEST A174 from Momentive Performance Materials, Waterford, N.Y.), 3-acryloxypropyltrimethoxysilane, 3-(methacryloyloxy) propyltriethoxysilane, 3-(methacryloyloxy) propylmethyldimethoxysilane, 3-(acryloyloxypropyl)methyldimethoxysilane, 3-(methacryloyloxy)propyldimethylethoxysilane, vinylmethyldiacetoxysilane, vinylmethyldiethoxysilane, vinyltriacetoxysilane, vinyltriethoxysilane, vinyltriisopropoxysilane, vinyltrimethoxysilane, vinyltriphenoxysilane, vinyltri-t-butoxysilane, vinyltris-isobutoxysilane, vinyltriisopropenoxysilane, vinyltris(2-methoxyethoxy)silane, and combinations thereof.

In some embodiments, the polymerizable composition for making the acrylic hardcoat layer includes at least 1 wt-%, or at least 5 wt-%, of polymerizable alkoxysilyl-functional ethylenically unsaturated monomers, based on the total weight of the polymerizable material. In some embodiments, the polymerizable composition for making the acrylic hardcoat layer includes up to 30 wt-%, or up to 25 wt-%, of polymerizable alkoxysilyl-functional ethylenically unsaturated monomers, based on the total weight of the polymerizable material.

Depending on the choice of polymerizable material, the composition may, optionally, contain one or more curatives that assist in polymerizing the polymerizable material. The choice of curative for specific polymerizable materials depends on the chemical nature of the copolymerizable material. For example, in the case of free-radically polymerizable resins, free radical thermal initiators and/or photoinitiators are useful curatives.

Typically, an optional curative is used in an amount effective to facilitate polymerization of the monomers/oligomers and the amount will vary depending upon, for example, the type of curative, the molecular weight of the curative, and the polymerization process. In certain embodiments, an optional curative is included in the composition in an amount of at least 0.01 wt-%, based on the total weight of the composition. In certain embodiments, an optional curative is included in the composition in an amount of up to 10 wt-%, based on the total weight of the composition.

Higher and lower amounts may also be used. Mixtures of curatives may be used if desired.

The hardcoat composition may be cured, for example, by exposure to a thermal source (e.g., heat, infrared radiation), electromagnetic radiation (e.g., ultraviolet and/or visible radiation), and/or particulate radiation (e.g., electron beam of gamma radiation).

Useful free-radical photoinitiators include, for example, benzoin ethers such as benzoin methyl ether and benzoin isopropyl ether, substituted benzoin ethers (e.g., anisoin methyl ether), substituted acetophenones (e.g., 2,2-dimethoxy-2-phenylacetophenone), substituted alpha-ketols (e.g., 2-methyl-2-hydroxypropiophenone), benzophenone derivatives (e.g., benzophenone), and acylphosphine oxides. Exemplary commercially available photoinitiators include photoinitiators under the tradename IRGACURE (e.g., IRGACURE 651, IRGACURE 184, and IRGACURE 819) or DAROCUR (e.g., DAROCUR 1173, DAROCUR 4265) from Ciba Specialty Chemicals, Tarrytown, N.Y., and under the tradename LUCIRIN (e.g., LUCIRIN TPO) from BASF, Parsippany, N.J.

In some embodiments, the acrylic hardcoat includes nanoparticles. Nanoparticles may include a range of particle sizes over a known particle size distribution for a given material. In some embodiments, the average particle size (e.g., particle diameter) is at least 1 nanometer (nm), at least 5 nm, at least 10 nm, or at least 50 nm (i.e., 0.05 micron). In some embodiments, the average particle size (e.g., particle diameter) is up to 60 microns, up to 75 nm, or up to 30 nm. Typical average particle size ranges include from 1 nm to 100 nm, 5 nm to 75 nm, 10 nm to 30 nm, or 0.05 micron to 60 microns. Particle sizes and particle size distributions may be determined in a known manner including, for example, by transmission electron microscopy (TEM). In addition to the foregoing particle sizes, use of smaller and larger average particle sizes are also contemplated.

Illustrative examples of nanoparticles include aluminum oxide, antimony tin oxide, bismuth subsalicylate, boehmite, calcium carbonate, calcium phosphate, cerium dioxide, graphene, halloysite, lanthanum boride, lithium carbonate, silver, antimony oxide, amorphous silica, colloidal silica, silicon dioxide, titanium dioxide, zinc oxide, zirconium oxide or dioxide. Various combinations of such nanoparticles may be used if desired. Suitable nanoparticles can be of many shapes including irregular and regular shapes, nanotubes, nanoplatelets, cylindrical, etc.

Preferred nanoparticles are silica nanoparticles. Silica nanoparticles suitable for use in the acrylic hardcoat are commercially available from Nalco Chemical Co. (Naperville, Ill.) under the product designation NALCO Colloidal Silicas. Suitable silica products include NALCO Products 1040, 1042, 1050, 1060, 2327, and 2329. Suitable fumed silica products include for example, products sold under the tradename AEROSIL series OX-50, -130, -150, and -200 from DeGussa AG (Hanau, Germany), and CAB-O-SPERSE 2095, CAB-O-SPERSE A105, CAB-O-SIL MS from Cabot Corp. (Tuscola, Ill.).

In some embodiments, the nanoparticles are surface-modified nanoparticles. Nanoparticles can be surface modified so that the nanoparticles provide a stable dispersion. "Stable dispersion" refers to a dispersion in which the colloidal nanoparticles do not agglomerate after standing for a period of time, such as about 24 hours, under ambient conditions, e.g., room temperature and atmospheric pressure, without extreme electromagnetic forces. The surface-treatment stabilizes the nanoparticles so that the particles will be well dispersed in a coatable composition and results in a substantially homogeneous composition. Furthermore, the nanoparticles can be modified over at least a portion of its surface with a surface treatment agent so that the stabilized particle can copolymerize or react with the (meth) acrylate monomers or oligomers during curing.

Metal oxide nanoparticles can be treated with a surface treatment agent to make them suitable for use in the acrylic hardcoat of the present invention. In general, a surface treatment agent has a first end that will attach to the particle surface (covalently, ionically or through strong physiosorption) and a second end that imparts compatibility of the particle with the coatable composition and/or reacts with coatable composition during curing. Examples of surface treatment agents include alcohols, amines, carboxylic acids, sulfonic acids, phosphonic acids, silanes, and titanates. The type of treatment agent can depend on the nature of the metal oxide surface. For example, silanes are typically preferred for silica and other siliceous fillers. Surface modification can be accomplished either subsequent to mixing with the coatable composition or after mixing. It may be preferred in the case of silanes to react the silanes with the particle or nanoparticle surface before incorporation into the coatable composition.

The amount of surface modifier can depend on factors such as particle size, particle type, modifier molecular weight, and modifier type. In general, a monolayer of modifier is attached to the surface of the particle. The attachment procedure or reaction conditions required also depend on the surface modifier used. For silanes, surface treatment may take place at elevated temperatures under acidic or basic conditions during a period of 1 hour up to 24 hours.

Surface treatment agents suitable for particles to be included in the acrylic hardcoat include compounds such as, for example, isooctyl trimethoxy-silane, N-(3-triethoxysilylpropyl) methoxyethoxyethoxyethyl carbamate (PEG3TES), SILQUEST A1230, N-(3-triethoxysilylpropyl) methoxyethoxyethoxyethyl carbamate (PEG2TES), 3-(methacryloyloxy)propyl trimethoxysilane (i.e., 3-(trimethoxysilyl)propyl methacrylate, available under the tradename SILQUEST A174 from Momentive Performance Materials, Waterford, N.Y.), 3-acryloxypropyltrimethoxysilane, 3-(methacryloyloxy)propyltriethoxysilane, 3-(methacryloyloxy) propylmethyldimethoxysilane, 3-(acryloyloxypropyl)methyldimethoxysilane, 3-(methacryloyloxy) propyldimethylethoxysilane, 3-(methacryloyloxy) propyldimethylethoxysilane, vinyldimethylethoxysilane, phenyltrimethoxysilane, n-octyltrimethoxysilane, dodecyltrimethoxysilane, octadecyltrimethoxysilane, propyltrimethoxysilane, hexyltrimethoxysilane, vinylmethyldiacetoxysilane, vinylmethyldiethoxysilane, vinyltriacetoxysilane, vinyltriethoxysilane, vinyltriisopropoxysilane, vinyltrimethoxysilane, vinyltriphenoxysilane, vinyltri-t-butoxysilane, vinyltris-isobutoxysilane, vinyltriisopropenoxysilane, vinyltris(2-methoxyethoxy)silane, styrylethyltrimethoxysilane, mercaptopropyltrimethoxysilane, 3-glycidoxypropyltrimethoxysilane, acrylic acid, methacrylic acid, oleic acid, stearic acid, dodecanoic acid, 2-[2(2-methoxyethoxy]ethoxyl acetic acid (MEEAA), beta-carboxyethylacrylate, 2-(2-methoxyethoxy)acetic acid, methoxyphenyl acetic acid, and mixtures of two or more of the foregoing.

Surface modification of the particles in a colloidal dispersion can be accomplished in a number of ways. The process involves the mixture of an inorganic dispersion with surface modifying agents and, optionally, a co-solvent such as, for example, 1-methoxy-2-propanol, ethanol, isopropanol, ethylene glycol, N,N-dimethylacetamide and 1-methyl-2-pyrrolidinone. Co-solvent can be added to enhance the solubility of the surface modifying agents as well as the surface modified particles. The mixture comprising the inorganic sol and surface modifying agents is subsequently reacted at room or an elevated temperature, with or without mixing. In one method, the mixture can be reacted at about 85° C. for about 24 hours, resulting in the surface-modified sol. In one method, where metal oxides are surface-modified, the surface treatment of the metal oxide can involve the adsorption of acidic molecules to the particle surface. The surface modification of the heavy metal oxide preferably takes place at room temperature.

In certain embodiments, at least 50% of the surface area of any individual particles is modified. In other embodiments, all of the surface area (100%) of any individual particle is modified.

In some embodiments of the disclosure, at least a portion of the nanoparticles may be surface modified in the manner described above (e.g., at least 80%). In other embodiments, all of the nanoparticles (100%) are surface modified. In still other embodiments, none of the particles are surface modified.

In some embodiments, the nanoparticles are present in an amount of up to 95 wt-%, up to 90 wt-%, up to 80 wt-%, or up to 70 wt-%, based on the total weight of the acrylic hardcoat layer. In some embodiments, the nanoparticles are present in an amount of at least 10 wt-%, at least 20 wt-%, at least 30 wt-%, at least 40 wt-%, or at least 50 wt-%, based on the total weight of the acrylic hardcoat layer.

The polymerizable hardcoat compositions can be formed by dissolving the polymerizable material(s) in a compatible organic solvent and then combined with the nanoparticle dispersion at a concentration of 60 to 70 percent solids. Examples of suitable organic solvents include alcohols (such as methanol, ethanol, and isopropanol), methyl ethyl ketone (MEK), methyl isobutyl ketone (MIBK), ethyl acetate, butyl acetate, and combinations (e.g., mixtures) thereof.

The hardcoat composition can be applied as a single layer or multiple layers to a substrate using conventional application techniques. Thin films can be applied using a variety of techniques, including dip coating, forward and reverse roll coating, wire wound rod coating, and die coating. Die coaters include knife coaters, slot coaters, slide coaters, fluid bearing coaters, slide curtain coaters, drop die curtain coaters, and extrusion coaters among others. Many types of die coaters are described in the literature. Although it is usually convenient for the substrate to be in the form of a roll of continuous web, the coatings may be applied to individual sheets.

In a typical process, the hardcoat composition is dried in an oven to remove the solvent and then cured, for example, by exposure to ultraviolet radiation using an H-bulb or other lamp at a desired wavelength, preferably in an inert atmosphere (less than 50 parts per million oxygen).

In certain embodiments, the thickness of the cured acrylic hardcoat layer is at least 0.5 micron, at least 1 micron, or at least 2 microns. In certain embodiments, the thickness of the hardcoat layer is no greater than 50 microns, or no greater than 25 microns. In certain embodiments, the thickness ranges from 5 microns to 15 microns.

Primer Layer

Primer layers of the present disclosure include composite particles that include an organic polymer portion and a siliceous portion. In certain embodiments, primer layers of the present disclosure include organic polymer core particles (as the organic polymer portion) having a siliceous shell (as the siliceous portion) thereon. As used herein, the term "shell" refers to a silica-containing coating on the surface of an organic polymer core particle.

In certain embodiments, the shell refers to a silicate coating (e.g., lithium silicate or sodium silicate) on an organic polymer core particle. In certain embodiments, the shell refers to an assembly of silica particles disposed on and covering (for example, densely covering) the surface of an organic polymer core particle (i.e., core organic polymer portion). In certain embodiments, the siliceous shell includes organo-modified silica particles. In certain embodiments, each core-shell particle includes a core organic polymer portion surrounded by a shell that comprises, and preferably consists essentially of, unmodified nonporous spherical silica particles disposed on the core organic polymer portion. In certain embodiments, each core-shell particle includes a core organic polymer portion and a silica or silicate precursor (e.g., TEOS or THOS or oligomers thereof) that can be hydrolyzed by acid or base. In certain embodiments, particles made by this method are not reversible (cannot be reversed to their starting components). In certain embodiments, each core-shell particle could include a combination of these shell materials.

Such composite particles can be applied out of an aqueous coating composition to form the primer layer. They can be used in various combinations if desired. The aqueous coating composition may include optional additives such as an organosilicate, a hydrolyzable organosilane, and a metal cation salt.

These composite particles after coating and drying provide a silicate-laden surface. These composite coatings are flexible due to the presence of the latex. The core particles could be fused into a continuous organic material after coating and drying. Such a composite coating can bind to an underlying organic or inorganic surface due to the presence of both organic and inorganic components of the composite particles.

In certain embodiments, composite particles described herein are reversible. For example, at low pH (e.g., under acidic conditions), the composite particles can be made from their component parts and at high pH (e.g., under basic conditions), the composite particles can be reversed to form their component starting materials.

The silica particles, in some embodiments, organo-modified silica particles, and in some embodiments, unmodified nonporous spherical silica nanoparticles, may optionally be covalently bonded one to another in the composition, but this is typically not preferred. However, once applied to a substrate and dried, it is preferred that the silica particles form covalent bonds that link them one to another (e.g., by acid sintering), and optionally to the substrate.

The weight ratio of the total amount of the silica in the composite particles (e.g., in a siliceous shell), corresponding to the theoretical amount of $SiO_2$ (prior to any pyrolysis to remove organic groups), to the total amount of the at least one polymer in the composite particles (e.g., in an organic polymer core) is in a range of 0.1 to 19, or 0.2 to 19, or 0.4 to 19, or 0.5 to 1.8, or 0.6 to 1.6, or 0.7 to 1.3.

In certain embodiments, composite particles according to the present disclosure have an average particle size of at least 60 nm. In certain embodiments, composite particles according to the present disclosure preferably have an average particle size of up to 250 nm, or up to 150 nm. Other average particle sizes are also acceptable. Mean (i.e., average) particle size can be determined using Dynamic Light Scattering (also known as Photon Correlation Spectroscopy). Various commercial instruments are available. One preferred instrument is available as a ZETASIZER NANO ZS from Malvern Instruments, Malvern, United Kingdom, used according to the manufacturer's instructions and with its accompanying software.

Organic Polymer Portion: The organic polymer portion may include a wide variety of polymers, typically one that can be prepared as a latex, more typically as an alkaline pH stable latex. In certain embodiments, the organic polymer portion comprises one or more water-insoluble polymers, although this is not a requirement. The polymer portion may have a wide variety of polymeric structures (e.g., linear, branched, hyperbranched and dendrimer-like). The polymer may be thermosetting or thermoplastic. Preferably, the polymer is a film-forming polymer.

The organic polymer portion may be cationic or non-cationic. In certain embodiments, the organic polymer portion (e.g., core particle) is non-cationic. By the term "non-cationic polymer," it is meant that composite particles are free of polymers having a permanently positively charged group such as, for example, tetraalkylammonium, pyridinium, guanidinium, or quaternary phosphonium. Protonated groups that readily dissociate in water (e.g., in response to the pH) may be included in a non-cationic polymer; however, in many embodiments they are not. By the term "cationic polymer," it is meant that composite particles include polymers that bear positive charges, which can be either intrinsically present in the polymer backbone and/or in the side chains. Most cationic polymers possess primary, secondary or tertiary amine functional groups that can be protonated. The placement of the positive charges may vary (e.g., in the backbone or side chains).

Exemplary non-cationic polymers include acrylic polymers, styrenic polymers, vinyl acetate-ethylene copolymers, polyvinyl acetate, styrene-butadiene rubbers, polyurethanes (including urethane-acrylic polymers), polyesters, polyamides, and combinations thereof (blends or copolymers). Preferably, the polymer comprises a polyurethane segment as in the case of a polyurethane or a urethane-acrylic polymer (which typically has polyurethane and polyacrylic segments). Suitable polymer latexes and methods for making them are widely known in the art, and many are commercially available.

Exemplary cationic polymers include natural polymers that are inherently cationic, as well as natural polymers that may be modified to acquire a cationic character. An example of the former is gelatin, which is a thermally denatured collagen extracted, for example, from porcine skin or bovine bone. Examples of the latter include chitosan, cyclodextrin, dextran, and cellulose. Exemplary cationic polymers also include polyethyleneimine, poly(L-lysine), polyamidoamine, poly(amino-co-ester), and poly(2-(N,N-dimethylamino) ethyl methacrylate).

Examples of commercially available polymer latexes include acrylic emulsion polymers available as NEOCRYL A612 and NEOCRYL A1049 from DSM Neo Resins, Wilmington, Mass., and 3M FAST TACK 1000NF acrylic emulsion from 3M Company, Saint Paul, Minn.; aqueous aliphatic polyurethane emulsions available as NEOREZ R-960, NEOREZ R-966, NEOREZ R-967, NEOREZ R-9036, and NEOREZ R-9699 from DSM Neo Resins, Inc., Wilmington, Mass.; aqueous anionic polyurethane dispersions available as ESSENTIAL CC4520, ESSENTIAL CC4560, ESSENTIAL R4100, and ESSENTIAL R4188 from Essential Industries, Inc., Merton, Wis.; polyester polyurethane dispersions available as SANCURE 843, SANCURE 898, and SANCURE 12929 from Lubrizol, Inc. of Cleveland, Ohio; an aqueous aliphatic self-crosslinking polyurethane dispersion available as TURBOSET 2025 from Lubrizol, Inc.; an aqueous anionic, co-solvent free, aliphatic self-crosslinking polyurethane dispersion, available as BAYHYDROL PR240 from Bayer Material Science, LLC of Pittsburgh, Pa.; and a carboxylated styrene-butadiene (SBR) latex emulsion available as ROVENE 5044 from Mallard Creek Polymers, Inc., Charlotte, N.C.

Combinations of polymers may be included in the organic polymer portion. For example, an individual organic polymer portion may include two or more polymers. Further, the composition may contain two types of organic polymer portions, each comprising a different type of polymer, for example, as would be obtained by mixing an acrylic latex and a polyurethane latex. Typically, the particles in the polymer latexes are substantially spherical in shape, although this is not a requirement.

Useful polymer particle sizes include those of typical of latexes and other dispersions or emulsions. In certain embodiments, polymer particle sizes are at least 5 nm, at least 10 nm, or at least 20 nm. In certain embodiments, polymer particle sizes are up to 250 nm, up to 70 nm, or up to 50 nm. Typical polymer particle sizes are in a range of 5 nm to 250 nm, 10 nm to 70 nm, 10 nm to 50 nm, or 20 nm to 50 nm, although this is not a requirement.

Siliceous Portion Including Metal Silicate: In certain embodiments, the siliceous portion may comprise, preferably consist essentially of (i.e., contain at least at least 95 wt-%), or even be composed entirely of, one or more metal silicates. Suitable metal silicates include lithium silicate, sodium silicate, potassium silicate, or combinations thereof.

In certain embodiments, the composite particles include one or more metal silicates in an amount of at least 45 wt-%, based on the total weight of the composite particles. In certain embodiments, the composite particles include one or more metal silicates in an amount of up to 98 wt-%, based on the total weight of the composite particles To make these particles, acidification is needed. Examples of these materials can be made using the techniques described in the Examples Section.

Siliceous Portion Including Organo-modified Silica Particles: In certain embodiments, the siliceous portion may comprise, preferably consist essentially of (i.e., contain), at least 95 wt-% (or even be composed entirely of) organo-modified silica particles having a mean particle diameter of 100 nm or less. That is, the silica particles have a volume average particle diameter (that is, a $D_{50}$) of 100 nanometers (nm) or less. In certain embodiments, the silica particles have a volume average particle size (e.g., diameter) of up to 100 nm, up to 60 nm, up to 35 nm, up to 25 nm, up to 20 nm, up to 10 mm, up to 5 mm, or up to 3 nm. In certain embodiments, the silica particles have a volume average particle size (e.g., diameter) of at least 0.8 nm, at least 1 nm, or at least 2 nm. In certain embodiments, the silica particles have a volume average particle diameter in a range of from 2 to 60 nm, or from 1 to 20 nm, or from 2 to 10 nm, or from 0.8 to 35 nm, or from 0.8 to 25 nm, or from 0.8 to 10 nm, or from 0.8 to 5 nm, or from 0.8 to 3 nm. The silica particles may have any particle size distribution consistent with the above 100 nm volume average particle diameter; for example, the particle size distribution may be monomodal or polymodal.

In some embodiments, the organo-modified silica particles are mono-disperse, with substantially the same size and shape. In some embodiments, the organo-modified silica particles may be individually bound (e.g., reversibly bound)

to the organic polymer portion. In some subsequent embodiments, some or all of the organo-modified silica particles can be bonded to other organo-modified silica particles (e.g., by acid sintering, multivalent metal ion cross-linking).

The organo-modified silica particles can be prepared, for example, by hydrolysis and condensation of a hydrolyzable organosilicate (e.g., tetraethoxysilane (TEOS) or tetramethoxysilane (TMOS)) in the presence of hydrolyzable organosilane represented by Formula (IV):

$$R^3Si(OR^4)_3 \quad (IV)$$

wherein $R^3$ represents a monovalent organic group, preferably having from 1 to 7 carbon atoms. $R^3$ may include aromatic and/or aliphatic moieties. Preferred the organic groups $R^3$ include alkyl groups having from 1 to 4 carbon atoms (e.g., methyl, ethyl, propyl, butyl), chloroalkyl groups having 1 to 6 carbon atoms (e.g., chloromethyl, 3-chloropropyl), epoxyalkyl groups having 3 to 10 carbon atoms, and epoxyalkyleneoxyalkyl groups having from 4 to 10 carbon atoms (e.g., 3-glycidyl, 3-glycidoxypropyl, 3-glycidoxypropyl-2-yl, 3-glycidoxyethyl, and oxiranyl), and alkenyl groups having from 2 to 6 carbon atoms (e.g., vinyl, allyl, and phenyl). The foregoing organic groups may optionally be substituted by catenary O, S, P, and/or N atoms.

In Formula (IV), each $R^4$ independently represents H, an alkyl group having from 1 to 4 carbon atoms, or an acyl group having from 1 to 4 carbon atoms. Exemplary $R^4$ groups include methyl, ethyl, propyl, butyl, acetyl, and propanoyl. Of these, ethyl and methyl are most preferred.

The above hydrolysis process is analogous to the well-known Stöber process for amine/base-catalyzed hydrolysis of a tetraalkoxyorthosilicate such as tetraethoxysilane or tetramethoxyorthosilicate. Exemplary amines/bases include alkylamines having from 1 to 4 carbon atoms (e.g., methylamine, ethylamine, dimethylamine, propylamine, butylamine), alkanolamines (e.g., ethanolamine, propanolamine), and ammonia (e.g., U.S. Pat. No. 4,806,665 (Jones et al.)).

Compositions according to the present disclosure that include core-shell particles that include the organo-modified silica particles in the shell can be prepared by various techniques. In one such technique, an aqueous dispersion of the organo-modified silica particles is mixed with a polymer latex while maintaining an alkaline pH (preferably a pH of 7 to 10). Simple mixing is generally effective for this step. Next, the composition is acidified with acid thereby causing the organo-modified silica particles to deposit as a shell (preferably, a monolayer shell) on the surfaces of the polymer latex particles. This deposition of silica particles is preferably reversible by adjusting the pH back above about 7. Typically, the resulting composite particles are particularly stable at low pH values (e.g., a pH of 1 to 4).

In an alternative method, an organosilicate (e.g., TMOS or TEOS), an organosilane (e.g., having the formula $R^3Si(OR^4)_3$ as described hereinabove) and the latex can be mixed together and the mixture hydrolyzed under alkaline conditions (e.g., using ammonia or an amine). Acidification of the hydrolyzed mixture causes the organo-modified silica particles, optionally in the presence of unmodified silica particles, to deposit as a siliceous portion (preferably, a monolayer shell) on the surface of each polymer latex particles as described above.

To achieve shell formation the organo-modified silica particles should typically be smaller than the organic polymer core, although this is not a requirement. For example, the mean particle diameter ($D_{50}$) of the organic polymer core may be on the order of at least 3 times greater than the mean particle diameter ($D_{50}$) of the organo-modified silica particles. More typically, the mean particle diameter of the organic polymer core should typically be on the order of at least 5 times, at least 10 times, or even at least 50 times greater than the mean particle diameter of the organo-modified silica particles.

For typical organic polymer core sizes, the weight ratio of the silica particles (collectively referring to the organo-modified silica particles and optional unmodified silica particles that may be present) to the organic polymer particles used in manufacture of the composite particles is in a range of from 30:70 to 98:2, preferably 50:50 to 95:5, more preferably 75:25 to 95:5, and even more preferably 60:40 to 90:10. Without wishing to be bound by theory, it is believed that during gradual acidification of such a dispersion of polymer particles (for example, latex particles) and silica particles in the aqueous liquid vehicle, the silica particles deposit on the surface of the polymer latex particles, eventually in sufficient quantity to form a siliceous shell (typically at least a monolayer of the silica particles) that serves to stabilize the dispersion and reduce or prevent agglomeration and precipitation of the polymer particles. It is further believed that upon addition of base to raise the pH that the silica particles dissociate from the polymer latex particles and regenerate a mixture of the two types of particles.

In certain embodiments, in the siliceous shell surrounding and disposed on the polymer core from 3 percent to 50 percent of silicon atoms in the siliceous shell are bonded to respective organic groups via a silicon-carbon covalent bond. In certain embodiments, the weight ratio of a total amount of the silica in the composition to the total amount of the organic polymer core is from 0.6 to 19.

Preferably, the siliceous portion is free of other particulate matter and/or silica particles.

Siliceous Portion Including Nonporous Spherical Nanoparticles: In certain embodiments, the silica particles of the shell are unmodified nonporous spherical nanoparticles have a mean particle size of 100 nm or less. That is, the nonporous spherical silica particles have a volume average particle diameter (that is, a $D_{50}$) of 100 nanometers (nm) or less. In certain embodiments, the nonporous spherical silica particles have a volume average particle diameter of up to 60 nm, up to 20 nm, or up to 10 nm. In certain embodiments, the nonporous spherical silica particles have a volume average particle diameter of at least 1 nm or at least 2 nm. The silica particles inay have any particle size distribution consistent with the above 100 nm volume average particle diameter: for example, the particle size distribution may be monomodal or polymodal.

Nonporous spherical silica particles in aqueous media (sols) are well known in the art and are available commercially; for example, as silica sols in water or aqueous alcohol solutions under the tradenames LUDOX from E. I. du Pont de Nemours and Co., Wilmington, Del., NYACOL from Nyacol Co. of Ashland, Mass., or NALCO from Nalco Chemical Co. of Naperville, Ill. One useful silica sol with a volume average particle size of 5 nm, a pH of 10.5, and a nominal solids content of 15 wt-%, is available as NALCO 2326 from Nalco Chemical Co. Other useful commercially available silica sols include those available as NALCO 1115 and NALCO 1130 from Nalco Chemical Co., as REMASOL SP30 from Remet Corp, of Utica, N.Y., and as LUDOX SM from E.I. du Pont de Nemours and Co. Still other useful aqueous colloidal silica sols are commercially available from Nissan Chemical America Corp. of Houston, Tex., under the tradenames SNOWTEX-XS, SNOWTEX-S, SNOWTEX-20L, SNOWTEX-30, SNOWTEX-40, SNOW- TEX-50, SNOWTEX-60, SNOWTEX-OS, SNOWTEX-O, SNOWTEX-O40, SNOWTEX-OL, SNOWTEX-N, SNOWTEX-N30G, SNOWTEX-N40, SNOWTEX-NXS, SNOWTEX-NS, SNOWTEX-XL, SNOWTEX-YL, and SNOWTEX-C.

Non-aqueous spherical silica sols are spherical silica sol dispersions wherein the liquid phase is an organic solvent. Typically, the silica sol is chosen so that its liquid phase is compatible with the remaining components of the continuous liquid phase of the primer coating composition. Typically, sodium-stabilized nonporous spherical silica particles should first be acidified prior to dilution with an organic solvent such as ethanol, as dilution prior to acidification may yield poor or non-uniform coatings. Ammonium-stabilized silica nanoparticles may generally be diluted and acidified in any order.

Core-shell particles having nonporous spherical silica nanoparticles in the shell may typically be prepared from an alkaline pH stable polymer particle dispersion and an alkaline spherical silica sol. Typically, such polymer particle dispersions become unstable upon acidification to pH values of 5 or less. Accordingly, it is unexpected that by adding the alkaline nonporous spherical silica sol to the aqueous polymer particle dispersion, with acidification, results in core-shell particles that are stable at low pH values.

To achieve shell formation in such core-shell particles, the unmodified nonporous spherical silica nanoparticles should typically be smaller than the organic polymer core, although this is not a requirement. For example, the volume average particle diameter (D50) of the polymer particles may be on the order of at least 3 times greater than the volume average particle diameter (D50) of the spherical silica particles, More typically, the volume average particle diameter of the polymer particles should typically be on the order of at least 5 times, at least 10 times, or even at least 50 times, greater than the volume average particle diameter of the spherical silica particles. For typical polymer particle sizes, a weight ratio of the nonporous spherical silica nanoparticles to the one or more organic polymer particles is in a range of from 30:70 to 98:2, preferably 80:20 to 95:5, and more preferably 85:15 to 95:5.

Without wishing to be bound by theory, it is believed that during gradual acidification of such a dispersion of polymer particles (for example, latex particles) and nonporous spherical silica particles in the aqueous liquid vehicle, the nonporous spherical silica particles deposit on the surface of the polymer latex particles, eventually in sufficient quantity to form a shell (typically at least a monolayer of the spherical silica particles) that serves to stabilize the dispersion and reduce or prevent agglomeration and precipitation of the polymer particles. It is further believed that upon addition of base to raise the pH that the nonporous spherical silica particles dissociate from the polymer latex particles and regenerate a mixture of the two types of particles.

In certain embodiments, each core-shell particle comprises an organic polymer core surrounded by a shell that consists essentially of nonporous spherical silica nanoparticles disposed on the organic polymer core. Accordingly, the shell is substantially free of other particulate matter, and especially acicular silica particles.

Primer Coating Composition: To facilitate coating, primer coating compositions according to the present disclosure preferably have a pH of 5 or less, more preferably 4 or less, and more still preferably 3 or less. To facilitate handling, the coating compositions preferably have a pH of at least 1, more preferably at least 2. In some embodiments, for example, those involving an acid sensitive substrate, it may be preferable to adjust the pH to a value of from about 5 to about 7.5, although this may tend to disrupt the core-shell particle structure.

Primer coating compositions may be acidified to the desired pH level with an acid having a $pK_a$ of less than 5, preferably less than 2.5, and inure preferably less than 1. Useful acids include both organic and inorganic acids such as, for example, oxalic acid, citric acid, benzoic acid, acetic acid, methoxyacetic acid, formic acid, propionic acid, benzenesulfonic acid, $H_2SO_3$, $H_3PO_4$, HCl, HBr, HI, $HBrO_3$, $HNO_3$, $HClO_4$, $H_2SO_4$, $CH_3SO_3H$, $CF_3SO_3H$, $CF_3CO_2H$, and $CH_3OSO_3H$. Preferred acids include HCl, $H_2SO_4$, and $H_3PO_4$. Combinations of organic and inorganic acids may also be used. Using weaker acids having a $pK_a$ of greater than 5 may not result in a uniform coating having the desirable properties such as transmissivity, cleanability and/or durability.

In some embodiments, primer coating compositions may further include at least one of an organic orthosilicate or a partially hydrolyzed oligomer thereof to impart durability to the primer layer and to densify the silica content for improving the anchoring of hydrophilic silanes. Exemplary organosilicates include, tetramethoxysilane (TMOS) and tetraethoxysilane (TEOS). The organosilicate may be present as a hydrolyzed oligomer as it exists in the composition.

In some embodiments, primer coating compositions may further include a hydrolyzable organosilane according to Formula (IV) as described above to impart stability to the coating composition. The hydrolyzable organosilane of Formula (IV) is added to the composition with mixing after the composite particles have been formed, and may be present as free material and/or as a reaction product with the composite particles (e.g., on at least a portion of their respective silica particle surfaces). If present, the added hydrolyzable organosilane is preferably added in an amount of at least 1 wt-%, or at least 4 wt-%, of the total weight of the resulting composition. If present, the added hydrolyzable organosilane is preferably added in an amount of up to 10 wt-%, or up to 7 wt-%, of the total weight of the resulting composition. Unexpectedly, the inclusion of a hydrolyzable organosilane increases storage stability of the composition.

In some embodiments, primer coating compositions further include a metal cation having a positive charge of at least +2 charge (i.e., a polyvalent metal cation) to impart mechanical durability of the primer layer by crosslinking and forming a network. In some embodiments, the charge of the metal cation is at least +3. Exemplary suitable metal cations include those provided by dissolving salts of polyvalent metals such as aluminum (+3), titanium (+4), vanadium (+3, +4, +5), manganese (+2, +3), zinc (+2), tin (+2, +4), and combinations thereof, in the aqueous vehicle. In some preferred embodiments, these metal cations include aluminum (+3) cations). These metal salts are stable in acidic solutions and are in the form of metal ions, not metal oxides (which typically occurs under basic conditions). If a polyvalent metal cation is included in a primer composition, it is preferably present in an amount of at least 0.1 wt-%, or at least 0.5 wt-%, based on the total weight of the composition. If a polyvalent metal cation is included in a primer composition, it is preferably present in an amount of up to 5 wt-%, or up to 3 wt-%, based on the total weight of the composition. Other amounts may also be used.

It is known that the stability of aqueous dispersions is affected by charged species, especially by monovalent alkali metal or ammonium cations that are typically used in commercially available silicate or silica nanoparticle or polymeric latex particle dispersions. These monovalent metal ions are found to greatly affect the primer coating compositions of the present disclosure. In some embodiments, metal silicates and/or silica nanoparticles that are in admixture with the organic starting materials are purified to remove ammonium, quaternary ammonium, and/or metal cations (e.g., alkali metal cations such as lithium, sodium, and potassium) that may be present. This may be done by any suitable method such as, for example, by contacting the composition with an ion exchange (i.e., with protons) resin. After purification, the ammonium, quaternary ammonium, and/or metal cations are reduced to an amount of less than 0.05 wt-%, based on the total weight of the primer coating composition. If it is desired to include a polyvalent metal cation in the composition, then such purification should be carried out prior to addition of the polyvalent metal cation.

Primer compositions of the present disclosure may also include one or more dispersion stabilizing agents such as epoxy-functional compounds of Formulas (V), (VI), (VII), and (VIII):

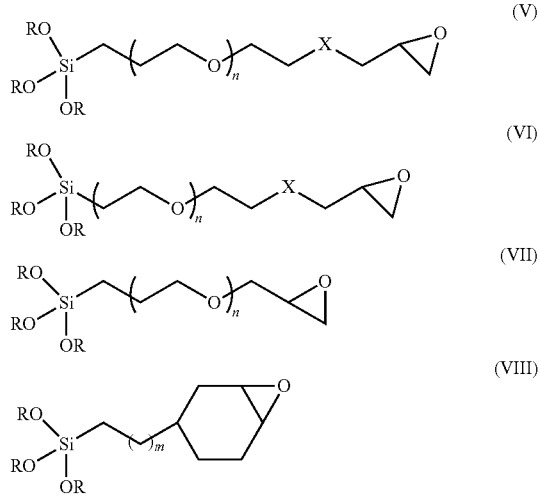

wherein:
each R is independently H, —CH$_3$, —C$_2$H$_5$, —C$_3$H$_7$, or —C$_4$H$_9$;
X=CH$_2$, O, S, or NHC(O)R$^1$;
each R$^1$ is independently —C$_2$H$_5$, —C$_3$H$_7$, or —C$_4$H$_9$;
n=0 to 10; and
m=1 to 4.

Primer coating compositions may have a wide range of non-volatile solids contents. In certain embodiments, primer coating compositions may have a solids content of at least 0.1 wt-%, at least 2 wt-%, or at least 3 wt-%. In certain embodiments, primer coating compositions may have a solids content of up to 15 wt-%, up to 10 wt-%, or up to 8 wt-%.

Primer coating compositions include an aqueous continuous liquid phase. Such aqueous continuous liquid phase may include at least 5 wt-% of water; for example, the aqueous continuous liquid phase may include at least 50 wt-%, at least 60 wt-%, at least 70 wt-%, at least 80 wt-%, or at least 90 wt-%, of water, or more.

While the aqueous continuous liquid phase is preferably essentially free of organic solvents (that is, contains less than 0.1 wt-% of organic solvents, based on the total weight of the aqueous continuous liquid phase), especially volatile organic solvents, organic solvents may optionally be included in a minor amount if desired. If present, the organic solvents should preferably be water-miscible, or at least water-soluble in the amounts in which they are used, although this is not a requirement. Examples of organic solvents include acetone and lower molecular weight ethers and/or alcohols such as methanol, ethanol, isopropanol, n-propanol, glycerin, ethylene glycol, triethylene glycol, propylene glycol, ethylene glycol monomethyl or monoethyl ether, diethylene or dipropylene glycol methyl or ethyl ether, ethylene or propylene glycol dimethyl ether, and triethylene or tripropylene glycol monomethyl or monoethyl ether, n-butanol, isobutanol, s-butanol, t-butanol, and methyl acetate.

Primer coating compositions according to the present disclosure may be made by any suitable mixing technique. One useful technique includes combining an alkaline polymer latex with an alkaline spherical silica sol of appropriate particle size, and then adjusting the pH to the final desired level.

Preferably, primer coating compositions according to the present disclosure are stable when stored in liquid form; for example, they do not gel, opacify, form precipitated or agglomerated particulates, or otherwise deteriorate significantly.

Primer compositions are preferably coated on a substrate having an acrylic hardcoat disposed thereon using conventional coating techniques, such as brush, bar, roll, wipe, curtain, rotogravure, spray, or dip coating techniques. For ease and simplicity, a preferred method is to wipe the coating composition using a suitable woven or nonwoven cloth, sponge, or foam. Such application materials are preferably acid-resistant and may be hydrophilic or hydrophobic in nature, preferably hydrophilic. Another method to control final thickness and resultant appearance is to apply the coating using any suitable method and, after allowing a portion of the solvent to evaporate, to rinse off excess composition with a stream of water, while the substrate is still fully or substantially wetted with the composition.

In certain embodiments, primer coating compositions according to the present disclosure are applied to an acrylic hardcoat on a substrate (or directly to the substrate) in a uniform average wet thickness of at least 0.5 micron, or at least 1 micron. In certain embodiments, primer coating compositions according to the present disclosure are applied to an acrylic hardcoat on a substrate (or directly to the substrate) in a uniform average wet thickness of up to 50 microns, or up to 10 microns. Such thicknesses typically avoid visible interference color variations in the primer layer, although other thicknesses may also be used.

The optimal average dry primer layer thickness is dependent upon the particular composition that is coated, but in general the average thickness of the dry primer layer is at least 0.05 micron. In certain embodiments, the average thickness of the dry primer layer is up to 5 microns, or up to 1 micron. Such thicknesses can be estimated, for example, from atomic force microscopy and/or surface profilometry. Above this range, the dry primer layer thickness variations typically cause optical interference effects, leading to visible iridescence (rainbow effect) of the dried coating which is particularly apparent on darker substrates. Below this range the dry primer layer thickness may be inadequate to confer sufficient durability when exposed to environmental wear.

After coating the surface of the substrate, the resultant article is typically dried at ambient or warm temperatures without the need for high temperature heat, radiation or other curing method. Although higher temperature may increase the speed of the drying process, such temperatures are usually not practical or convenient and care must be exercised to avoid damage to the substrate.

Superhydrophilic Surface Layer

A superhydrophilic surface is defined as having a static contact angle of water of 15° or less. Suitable superhydrophilic surface layers (i.e., "topcoats" or "topcoat layers") are prepared from hydrophilic-functional coating compositions that include one or more hydrophilic-functional compounds. The hydrophilic groups render hydrophilicity to the surface. Suitable hydrophilic functional groups include sulfonate groups, phosphate groups, phosphonic groups, carboxylate groups, gluconamide-containing groups, sugar-containing groups, polyvinyl alcohol-containing groups, and quaternary ammonium groups. In certain embodiments, the superhydrophilic surface layer includes hydrophilic groups selected from sulfonate groups ($-SO_3^-$), phosphate groups ($-OPO_3H^-$), phosphonic groups ($-PO_3H^-$), and carboxylate groups ($-CO_2^-$). In certain embodiments, the superhydrophilic surface layer includes sulfonate groups (i.e., sulfonate functionality).

These compounds also have alkoxysilane-functional and/or silanol-functional groups for bonding to an underlying primer layer. For certain embodiments, the hydrophilic-containing compounds are zwitterionic and for certain embodiments, they are non-zwitterionic.

A superhydrophilic layer includes an oligomeric and/or polymeric siloxane network (Si—O—) with hydrophilic functional groups pendant therefrom (e.g., sulfonate groups). The amount of hydrophilic functional compounds used to make a cured superhydrophilic surface layer is at least 12 molar-% or at least 25 weight-%, based on the entire amount of the resultant cured superhydrophilic surface layer. The amount of hydrophilic functional compounds used to make a cured superhydrophilic surface layer is up to 100 molar-%, based on the entire amount of the resultant cured superhydrophilic surface layer.

In certain embodiments, the non-zwitterionic compounds used in the coating compositions for the superhydrophilic surface layer of the present disclosure have the following Formulas (IX), (X), (XI), and (XII):

$$[(MO)(Q_n)Si(XSO_3^-)_{3-n}]Y_{2/nr}^{+r} \quad (IX)$$

$$[(MO)(Q_n)Si(XPO_3H^-)_{3-n}]Y_{2/nr}^{+r} \quad (X)$$

$$[(MO)(Q_n)Si(XOPO_3H^-)_{3-n}]Y_{2/nr}^{+r} \quad (XI)$$

$$[(MO)(Q_n)Si(XCO_2^-)_{3-n}]Y_{2/nr}^{+r} \quad (XII)$$

wherein:
each Q is independently selected from hydroxyl, alkyl groups containing from 1 to 4 carbon atoms, and alkoxy groups containing from 1 to 4 carbon atoms;
M is selected from hydrogen, alkyl groups containing from 1 to 4 carbon atoms, alkali metals, and organic cations of strong organic bases having an average molecular weight of less than 150 and a pKa of greater than 11;
X is an organic linking group;
Y is selected from hydrogen, alkaline earth metals (e.g., magnesium, calcium, etc.), organic cations of protonated weak bases having an average molecular weight of less than 200 and a pKa of less than 11 (e.g., 4-aminopyridine, 2-methoxyethylamine, benzylamine, 2,4-dimethylimidazole, 3-[2-ethoxy(2-ethoxyethoxy)]propylamine), alkali metals, and organic cations of strong organic bases having an average molecular weight of less than 150 and a pKa of greater than 11 (e.g., $^+N(CH_3)_4$, $^+N(CH_2CH_3)_4$), provided that M is hydrogen when Y is selected from hydrogen, alkaline earth metals, and organic cations of said protonated weak bases;
r is equal to the valence of Y; and
n is 1 or 2.

Preferably, the non-zwitterionic compounds of Formulas (IX), (X), (XI), and (XII) are alkoxysilane compounds (e.g., wherein Q is an alkoxy group containing from 1 to 4 carbon atoms).

In certain embodiments, the weight percentage of oxygen in compounds of Formulas (IX), (X), (XI), and (XII) is at least 20%, at least 25%, at least 30%, at least 35%, at least 40%, or at least 45%. In certain embodiments, the weight percentage of oxygen in compounds of Formulas (IX), (X), (XI), and (XII) is up to 55%. In certain embodiments, the range of oxygen in compounds of Formulas (IX), (X), (XI), and (XII) is 45% to 55%. The weight percentage of silicon in compounds of Formulas (IX), (X), (XI), and (XII) is no greater than 15%. Each of these percentages is based on the weight of the compound in the water-free acid form.

The organic linking group X of Formulas (IX), (X), (XI), and (XII) is preferably selected from alkylene groups, cycloalkylene groups, alkyl-substituted cycloalkylene groups, hydroxy-substituted alkylene groups, hydroxy-substituted mono-oxa alkylene groups, divalent hydrocarbon groups having mono-oxa backbone substitution, divalent hydrocarbon groups having mono-thia backbone substitution, divalent hydrocarbon groups having monooxo-thia backbone substitution, divalent hydrocarbon groups having dioxo-thia backbone substitution, arylene groups, arylalkylene groups, alkylarylene groups, and substituted alkylarylene groups. Most preferably X is selected from alkylene groups, hydroxy-substituted alkylene groups, and hydroxy-substituted mono-oxa alkylene groups.

Suitable examples of non-zwitterionic compounds of Formula (IX) are described in U.S. Pat. No. 4,152,165 (Langager et al.) and U.S. Pat. No. 4,338,377 (Beck et al.), and include, for example, the following:

$(HO)_3Si-CH_2CH_2CH_2-O-CH_2-CH(OH)-CH_2SO_3^-H^+$;

$(HO)_3Si-CH_2CH(OH)-CH_2SO_3^-H^+$;

$(HO)_3Si-CH_2CH_2CH_2SO_3^-H^+$;

$(HO)_3-Si-C_6H_4-CH_2CH_2SO_3^-H^+$;

$(HO)_2Si-[CH_2CH_2SO_3^-H^+]_2$;

$(HO)-Si(CH_3)_2-CH_2CH_2SO_3^-H^+$;

$(NaO)(HO)_2Si-CH_2CH_2CH_2-O-CH_2-CH(OH)-CH_2SO_3^-Na^+$; and $(HO)_3Si-CH_2CH_2SO_3^-K^+$.

In certain embodiments, the zwitterionic sulfonate, phosphate, phosphonic, or carboxylate organosilanol compounds have the following Formulas (XIII), (XIV), (XV), or (XVI):

$$(R^1O)_p-Si(R^2)_q-W-N^+(R^3)(R^4)-(CH_2)_m-SO_2^- \quad (XIII)$$

$$(R^1O)_p-Si(R^2)_q-W-N^+(R^3)(R^4)-(CH_2)_m-PO_3H^- \quad (XIV)$$

$$(R^1O)_p-Si(R^2)_q-W-N^+(R^3)(R^4)-(CH_2)_m-OPO_3H^- \quad (XV)$$

$$(R^1O)_p-Si(R^2)_q-W-N^+(R^3)(R^4)-(CH_2)_m-CO_2^- \quad (XVI)$$

wherein:

each $R^1$ is independently a hydrogen, methyl group, or ethyl group;

each $R^2$ is independently a methyl group or an ethyl group;

each $R^3$ and $R^4$ is independently a saturated or unsaturated, straight chain, branched, or cyclic organic group, which may be joined together, optionally with atoms of the group W, to form a ring;

W is an organic linking group;

p and m are integers of 1 to 4;

q is 0 or 1; and p+q=3.

The organic linking group W of Formulas (XIII), (XIV), (XV), and (XVI) is preferably selected from saturated or unsaturated, straight chain, branched, or cyclic organic groups. The linking group W is preferably an alkylene group, which may include carbonyl groups, urethane groups, urea groups, heteroatoms such as oxygen, nitrogen, and sulfur, and combinations thereof. Examples of suitable linking groups W include alkylene groups, cycloalkylene groups, alkyl-substituted cycloalkylene groups, hydroxy-substituted alkylene groups, hydroxy-substituted mono-oxa alkylene groups, divalent hydrocarbon groups having mono-oxa backbone substitution, divalent hydrocarbon groups having mono-thia backbone substitution, divalent hydrocarbon groups having monooxo-thia backbone substitution, divalent hydrocarbon groups having dioxo-thia backbone substitution, arylene groups, arylalkylene groups, alkylarylene groups, and substituted alkylarylene groups.

Suitable examples of zwitterionic compounds of Formula (XIII) are described in U.S. Pat. No. 5,936,703 (Miyazaki et al.) and International Publication Nos. WO 2007/146680 (Schlenoff) and WO 2009/119690 (Yamazaki et al.), and include the following zwitterionic functional groups ($-W-N^+(R^3)(R^4)-(CH_2)_m-SO_3^-$).

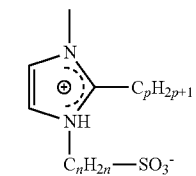
Sulfoalkyl imidazolium salts

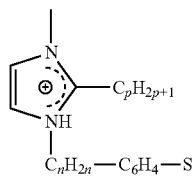
Sulfoaryl imidazolium salts

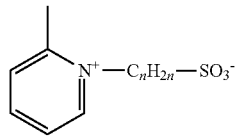
Sulfoalkyl pyridinium salts

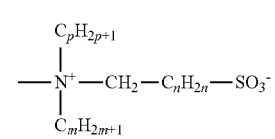
Sulfoalkyl ammonium salts (sulfobetaine)

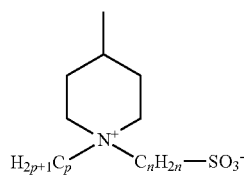
Sulfoalkyl piperidinium salts

In certain embodiments, the zwitterionic sulfonate-organosilanol compounds used in coating compositions for the superhydrophilic surface layer of the present disclosure have the following Formula (XVII):

$$(R^1O)_p-Si(R^2)_q-CH_2CH_2CH_2-N^+(CH_3)_2-(CH_2)_m-SO_3^- \quad (XVII)$$

wherein:

each $R^1$ is independently a hydrogen, methyl group, or ethyl group;

each $R^2$ is independently a methyl group or an ethyl group;

p and m are integers of 1 to 4;

q is 0 or 1; and p+q=3.

Suitable examples of zwitterionic compounds of Formula (XVII) are described in U.S. Pat. No. 5,936,703 (Miyazaki et al.), including, for example:

$(CH_3O)_3Si-CH_2CH_2CH_2-N^+(CH_3)_2-CH_2CH_2CH_2CH_2-SO_3^-$; and $(CH_3CH_2O)_2Si(CH_3)-CH_2CH_2CH_2-N^+(CH_3)_2-CH_2CH_2CH_2-SO_3^-$.

Other examples of suitable zwitterionic compounds, which can be made using standard techniques include the following:

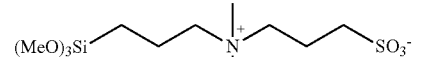

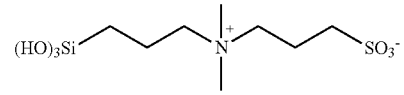

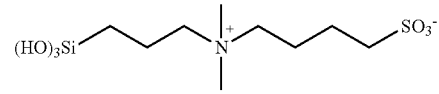

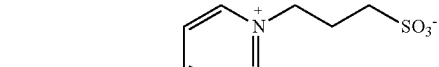

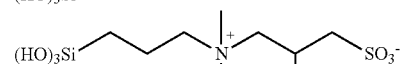

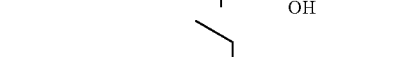

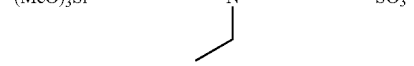

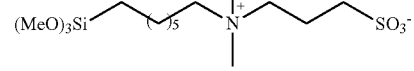

In general, these hydrophilic-functional compounds behave similarly in imparting surfaces with high hydrophilicity, rinse-away, and easy-to-clean performance. In specific applications, however, sulfonate-functional compounds, particularly zwitterionic sulfonate-functional compounds, are more advantageous than other hydrophilic-functional compounds because the sulfonates are less likely to complex with inorganic or organic ammonium cations, including antimicrobial or cationic surfactants. Thus, the protected surfaces are less likely to be contaminated by these cationic species.

The coating compositions for the superhydrophilic surface layer are referred to herein as "superhydrophilic surface coating compositions." They typically include one or more hydrophilic-functional compounds (e.g., sulfonate-functional compounds) in an amount of at least 0.1 wt-%, and often at least 1 wt-%, based on the total weight of the coating composition. Hydrophilic-functional coating compositions typically include one or more hydrophilic-functional compounds (e.g., sulfonate-functional compounds) in an amount of no greater than 20 wt-%, and often no greater than 5 wt-%, based on the total weight of the coating composition. Generally, for monolayer coating thicknesses, relatively dilute coating compositions are used. Alternatively, relatively concentrated coating compositions can be used and subsequently rinsed.

Superhydrophilic surface coating compositions preferably include alcohol, water, or hydroalcoholic solutions (i.e., alcohol and/or water) as a diluent. Typically, such alcohols are lower alcohols (e.g., C1 to C8 alcohols, and more typically C1 to C4 alcohols), such as methanol, ethanol, propanol, 2-propanol, etc. Preferably, hydrophilic-functional coating compositions are aqueous compositions, typically aqueous solutions. As it is used herein, the term "aqueous composition" (e.g., "aqueous solution") refers to compositions (e.g., solutions) containing water. Such compositions may employ water as the only diluent or they may employ combinations of water and organic solvents such as alcohol and acetone. Organic solvents may also be included in the hydrophilic treatment compositions so as to improve their freeze-thaw stability. Alternatively, the diluent in a coating composition can be 100% organic solvent(s) (i.e., no water). In certain embodiments, a diluent is present in an amount of up to 98 wt-%, or up to 50 wt-%, based on the total weight of the coating composition. In certain embodiments, a diluent is present in an amount of at least 2 wt-%, based on the total weight of the coating composition. In certain embodiments, a diluent is present in a range of 2 wt-% to 50 wt-%, based on the total weight of the coating composition.

Superhydrophilic surface coating compositions can be acidic, basic, or neutral. The performance durability of the coatings can be affected by pH. For example, coating compositions containing sulfonate-functional zwitterionic compounds are preferably neutral.

Superhydrophilic surface coating compositions may be provided in a variety of viscosities. Thus, for example, the viscosity may vary from a water-like thinness to a paste-like heaviness. They may also be provided in the form of gels. Additionally, a variety of other ingredients may be incorporated in the compositions.

In certain embodiments, superhydrophilic surface coating compositions may further include a coupling agent such as a tetraalkoxysilane compound (e.g., tetraethylorthosilicate (TEOS)), oligomers of such compounds (e.g., alkyl polysilicates such as poly(diethoxysiloxane)), lithium silicate, sodium silicate, potassium silicate, silica (e.g., silica particles having an average particle size of 100 nm or less), or combinations thereof, which can provide enhanced durability. Such coupling agents can function in several ways. They can strengthen the bonding within the oligomeric/polymeric siloxane network. They can also improve the interfacial bonding between the superhydrophilic surface layer and the underlying surface. In some embodiments, the amount of such coupling agent included in the coating composition should be limited in order to prevent destruction of anti-fog properties and/or easy cleanability (e.g., rinse-away properties) of the coating. The optimal amount of coupling agent is determined experimentally and is dependent on the coupling agent's identity, molecular weight, and refractive index. The coupling agent(s), when present, are typically added to the coating composition at levels of at least 0.1 wt-%, or at least 1 wt-%, based on the total weight of the coating composition. The coupling agent(s), when present, are typically added to the coating composition at levels of up to 20 wt-%, or up to 15 wt-%, based on the total weight of the coating composition.

Superhydrophilic surface coating compositions (i.e., hydrophilic-functional coating compositions) are preferably coated using conventional techniques, such as bar, roll, curtain, rotogravure, spray, or dip coating techniques. The preferred methods include bar and roll coating, or air knife coating to adjust thickness.

Superhydrophilic surface coating compositions of the present disclosure are preferably applied in a monolayer thickness. Typically, a resultant superhydrophilic surface layer is no greater than 10 microns thick, and preferably no greater than 1 micron thick, as measured using an ellipsometer such as a Gaertner Scientific Corp Model No. L115C.

Once coated, superhydrophilic surface coating compositions are typically dried at temperatures of 20° C. to 200° C. using, for example, a recirculating oven. An inert gas may be circulated. The temperature may be increased further to speed the drying process, but care must be exercised to avoid damage to the substrate.

Superhydrophilic surface layers prepared from superhydrophilic surface coating compositions provide anti-fog properties and easy cleanability (e.g., rinse-away cleaning properties) to surfaces coated therewith. The anti-fog property is demonstrated by the tendency of the coatings to resist the formation of water droplets which tend to significantly reduce the transparency of the coated substrate. Water vapor from, for example, human breathing, tends to condense upon the coated substrate in the form of a thin uniform water film, rather than as water droplets. Such a uniform film does not significantly reduce the clarity or transparency of the substrate.

ILLUSTRATIVE EMBODIMENTS

Embodiment 1 is a film comprising: an organic polymeric substrate having a first major surface and a second major surface; an optional acrylic hardcoat layer disposed on the first major surface of the substrate; a siliceous primer layer disposed on the organic polymeric substrate or on the optional acrylic hardcoat layer; and a superhydrophilic surface layer disposed on the siliceous primer layer, wherein the superhydrophilic surface layer comprises hydrophilic-functional groups. Preferred films include an acrylic hardcoat layer.

Embodiment 2 is the film of embodiment 1 wherein the organic polymeric substrate is a flexible sheet material.

Embodiment 3 is the film of embodiment 1 or 2 wherein the superhydrophilic surface layer is no greater than 10 microns thick.

Embodiment 4 is the film of any one of embodiments 1 to 3 wherein the superhydrophilic surface layer is prepared from a coating composition comprising one or more hydrophilic-functional compounds comprising one or more sulfonate groups, phosphate groups, phosphonic groups, carboxylate groups, gluconamide-containing groups, sugar-containing groups, polyvinyl alcohol-containing groups, or quaternary ammonium groups, and further comprise alkoxysilane- and/or silanol-functional groups.

In certain embodiments, the superhydrophilic surface layer is prepared from a coating composition comprising one or more hydrophilic-functional compounds comprising one or more sulfonate groups, phosphate, phosphonic, and carboxylate groups.

Embodiment 5 is the film of embodiment 4 wherein the hydrophilic-functional compounds further comprise alkoxysilane-functional and/or silanol-functional groups.

Embodiment 6 is the film of embodiment 4 or 5 wherein the hydrophilic-functional compounds are non-zwitterionic.

Embodiment 7 is the film of embodiment 6 wherein the non-zwitterionic compounds are hydrophilic-functional compounds of Formulas (IX), (X), (XI), and (XII):

  (IX)

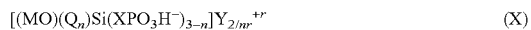  (X)

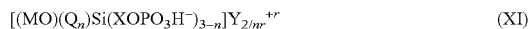  (XI)

  (XII)

wherein:
  each Q is independently selected from hydroxyl, alkyl groups containing from 1 to 4 carbon atoms, and alkoxy groups containing from 1 to 4 carbon atoms;
  M is selected from hydrogen, alkyl groups containing from 1 to 4 carbon atoms, alkali metals, and organic cations of strong organic bases having an average molecular weight of less than 150 and a pKa of greater than 11;
  X is an organic linking group;
  Y is selected from hydrogen, alkaline earth metals (e.g., magnesium, calcium, etc.), organic cations of protonated weak bases having an average molecular weight of less than 200 and a pKa of less than 11 (e.g., 4-aminopyridine, 2-methoxyethylamine, benzylamine, 2,4-dimethylimidazole, 3-[2-ethoxy(2-ethoxyethoxy)]propylamine), alkali metals, and organic cations of strong organic bases having an average molecular weight of less than 150 and a pKa of greater than 11 (e.g., $^+N(CH_3)_4$, $^+N(CH_2CH_3)_4$), provided that M is hydrogen when Y is selected from hydrogen, alkaline earth metals, and organic cations of said protonated weak bases;
  r is equal to the valence of Y; and
  n is 1 or 2.

Embodiment 8 is the film of embodiment 7 wherein the non-zwitterionic compound is of Formula (IX).

Embodiment 9 is the film of embodiment 7 or 8 wherein the organic linking group X is selected from alkylene groups, cycloalkylene groups, alkyl-substituted cycloalkylene groups, hydroxy-substituted alkylene groups, hydroxy-substituted mono-oxa alkylene groups, divalent hydrocarbon groups having mono-oxa backbone substitution, divalent hydrocarbon groups having mono-thia backbone substitution, divalent hydrocarbon groups having monooxo-thia backbone substitution, divalent hydrocarbon groups having dioxo-thia backbone substitution, arylene groups, arylalkylene groups, alkylarylene groups, and substituted alkylarylene groups.

Embodiment 10 is the film of embodiment 4 or 5 wherein the hydrophilic-functional compounds are zwitterionic.

Embodiment 11 is the film of embodiment 10 wherein the zwitterionic compounds are hydrophilic-functional compounds of Formulas (XIII), (XIV), (XV), and (XVI):

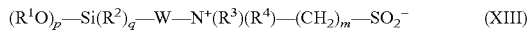  (XIII)

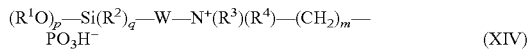  (XIV)

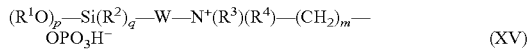  (XV)

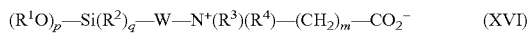  (XVI)

wherein:
  each $R^1$ is independently a hydrogen, methyl group, or ethyl group;
  each $R^2$ is independently a methyl group or an ethyl group;
  each $R^3$ and $R^4$ is independently a saturated or unsaturated, straight chain, branched, or cyclic organic group, which may be joined together, optionally with atoms of the group W, to form a ring;
  W is an organic linking group;
  p and m are integers of 1 to 4;
  q is 0 or 1; and
  p+q=3.

Embodiment 12 is the film of embodiment 11 wherein the zwitterionic compound is of Formula (XIII).

Embodiment 13 is the film of embodiment 12 wherein the organic linking group W is selected from saturated or unsaturated, straight chain, branched, or cyclic organic groups. In certain embodiments, the linking group W is an alkylene group, which may include carbonyl groups, urethane groups, urea groups, heteroatoms such as oxygen, nitrogen, and sulfur, and combinations thereof.

Embodiment 14 is the film of any one of embodiments 10 to 13 wherein the zwitterionic compounds comprise a zwitterionic functional group ($—W—N^+(R^3)(R^4)—(CH_2)_m—SO_3^-$).

Embodiment 15 is the film of embodiment 14 wherein the zwitterionic functional groups are selected from groups.

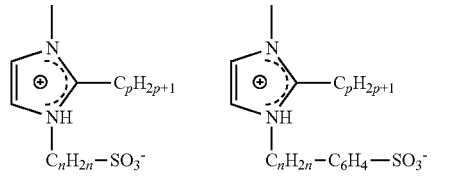

Sulfoalkyl imidazolium salts    Sulfoaryl imidazolium salts

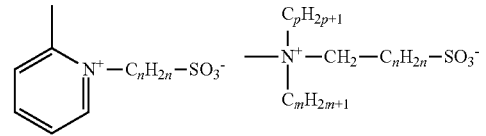

Sulfoalkyl pyridinium salts    Sulfoalkyl ammonium salts (sulfobetaine)

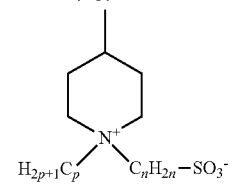

Sulfoalkyl piperidinium salts

Embodiment 16 is the film of embodiment 10 wherein the zwitterionic compounds are sulfonate-organosilanol compounds of Formula (XVII):

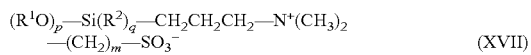

(XVII)

wherein:
each $R^1$ is independently a hydrogen, methyl group, or ethyl group;
each $R^2$ is independently a methyl group or an ethyl group;
p and m are integers of 1 to 4;
q is 0 or 1; and
p+q=3.

Embodiment 17 is the film of embodiment 10 wherein the zwitterionic compounds are selected from:

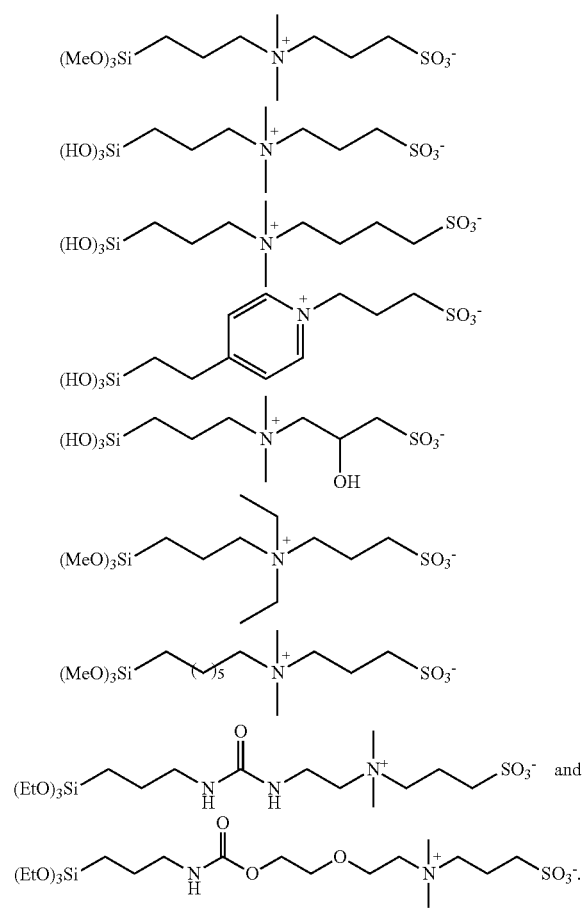

Embodiment 18 is the film of any one of embodiments 4 to 17 wherein the superhydrophilic surface layer is prepared from an aqueous coating composition comprising one or more hydrophilic-functional compounds in an amount of at least 0.1 wt-%, and no greater than 20 wt-%, based on the total weight of the coating composition.

Embodiment 19 is the film of any one of embodiments 4 to 18 wherein the superhydrophilic surface layer is prepared from a coating composition further comprising a coupling agent selected from the group of a tetraalkoxysilane compound, an oligomer of a tetraalkoxysilane compound, lithium silicate, sodium silicate, potassium silicate, silica particles, and combinations thereof, which can provide enhanced durability.

Embodiment 20 is the film of embodiment 19 wherein the coupling agent is present in the coating composition for the superhydrophilic surface layer in an amount of 0.1 wt-% to 20 wt-%, based on the total weight of the coating composition.

Embodiment 21 is the film of any one of embodiments 2 to 20 wherein the acrylic hardcoat comprises alkoxysilyl groups.

Embodiment 22 is the film of embodiment 21 wherein the hardcoat layer is non-tacky and has a Tg of at least 40° C.

Embodiment 23 is the film of any one of embodiments 2 to 22 wherein the acrylic hardcoat layer has a thickness of at least 0.5 micron and no greater than 50 microns.

Embodiment 24 is the film of any one of embodiments 2 to 23 wherein the acrylic hardcoat layer is prepared from free-radically polymerizable monomers and/or oligomers.

Embodiment 25 is the film of embodiment 24 wherein the free-radically polymerizable monomers and/or oligomers comprise multifunctional (meth)acrylate monomers and/or oligomers.

Embodiment 26 is the film of embodiment 25 wherein the free-radically polymerizable monomers and/or oligomers comprise 10 wt-% to 100 wt-% multifunctional (meth)acrylate monomers and/or oligomers, based on the total weight of the polymerizable material.

Embodiment 27 is the film of embodiment 25 or 26 wherein the multifunctional (meth)acrylate monomers and/or oligomers comprise 5 wt-% to 100 wt-% multifunctional (meth)acrylate monomers and/or oligomers having a Tg of at least 40° C., based on the total weight of the (meth)acrylate monomers and/or oligomers.

Embodiment 28 is the film of embodiment 27 wherein the multifunctional (meth)acrylate monomers and/or oligomers having a Tg of at least 40° C. comprise trimethylolpropane triacrylate, pentaerythritol triacrylate, tris(2-hydroxyethylisocyanurate) triacrylate, di-trimethylolpropane tetraacrylate, dipentaerythritol pentaacrylate, pentaerythritol tetraacrylate, or combinations thereof.

Embodiment 29 is the film of any one of embodiments 25 to 28 wherein the multifunctional (meth)acrylate monomers and/or oligomers comprise 5 wt-% to 30 wt-% multifunctional (meth)acrylate monomers and/or oligomers having a Tg of less than 25° C., based on the total weight of the (meth)acrylates monomers and/or oligomers.

Embodiment 30 is the film of embodiment 29 wherein the multifunctional (meth)acrylate monomers and/or oligomers having a Tg of less than 25° C. comprise ethoxylated(20) trimethylolpropane triacrylate, ethoxylated(15) trimethylolpropane triacrylate, 2(2-ethoxyethoxy) ethyl acrylate, polyethylene glycol(400) diacrylate, polyethylene glycol(600) dimethacrylate, methoxy polyethylene glycol(350) monomethacrylate, propoxylated glyceryl triacrylate, ethoxylated pentaerythritol tetraacrylate, or combinations thereof.

Embodiment 31 is the film of any one of embodiments 24 to 30 wherein the free-radically polymerizable monomers and/or oligomers further comprise alkoxysilyl-containing ethylenically unsaturated monomers.

Embodiment 32 is the film of embodiment 31 wherein the free-radically polymerizable monomers and/or oligomers comprise 1 wt-% to 30 wt-% alkoxysilyl-containing ethylenically unsaturated monomers, based on the total weight of the polymerizable material.

Embodiment 33 is the film of embodiment 31 or 32 wherein the alkoxysilyl-containing ethylenically unsaturated monomers comprise compounds of Formulas (I), (II), and (III):

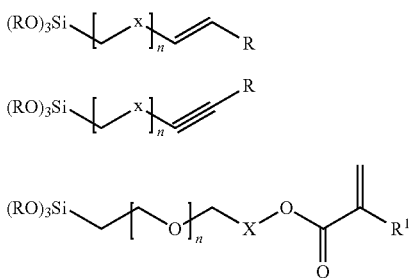

(I)
(II)
(III)

wherein for Formulas (I) and (II):
each R is independently H, —$CH_3$, —$C_2H_5$, —$C_3H_7$, or —$C_4H_9$;
X=$CH_2$ or O; and
n=0 to 10;
wherein for Formula (III):
each R is independently H, —$CH_3$, —$C_2H_5$, —$C_3H_7$, or —$C_4H_9$;
$R^1$ is —$CH_3$ or H;
X=$CH_2$, O, S, or $NHC(O)R^2$;
$R^2$ is independently —$C_2H_5$, —$C_3H_7$, or —$C_4H_9$; and
n=0 to 10.

Embodiment 34 is the film of any one of embodiments 2 to 33 wherein the acrylic hardcoat comprises nanoparticles.

Embodiment 35 is the film of embodiment 34 wherein the nanoparticles comprise aluminum oxide, antimony tin oxide, bismuth subsalicylate, boehmite, calcium carbonate, calcium phosphate, cerium dioxide, graphene, halloysite, lanthanum boride, lithium carbonate, silver, antimony oxide, amorphous silica, colloidal silica, silicon dioxide, titanium dioxide, zinc oxide, zirconium oxide or dioxide, or combinations thereof.

Embodiment 36 is the film of embodiment 35 wherein the nanoparticles comprise silica nanoparticles (amorphous or colloidal).

Embodiment 37 is the film of any one of embodiments 34 to 36 wherein the nanoparticles are surface-modified nanoparticles.

Embodiment 38 is the film of embodiment 37 wherein the surface-modified nanoparticles are surface treated with a compound selected from isooctyl trimethoxy-silane, N-(3-triethoxysilylpropyl) methoxyethoxyethyl carbamate (PEG3TES), SILQUEST A1230, N-(3-triethoxysilylpropyl) methoxyethoxyethyl carbamate (PEG2TES), 3-(methacryloyloxy)propyltrimethoxysilane, 3-acryloxy-propyltrimethoxysilane, 3-(methacryloyloxy)propyltri-ethoxysilane, 3-(methacryloyloxy) propylmethyldimethoxysilane, 3-(acryloyloxypropyl)methyldimethoxysilane, 3-(methacryloyloxy)propyldimethylethoxysilane, 3-(methacryloyloxy) propyldimethylethoxysilane, vinyldimethylethoxysilane, phenyltrimethoxysilane, n-octyltrimethoxysilane, dodecyltrimethoxysilane, octadecyltrimethoxysilane, propyltrimethoxysilane, hexyltrimethoxysilane, vinylmethyldiacetoxysilane, vinylmethyldiethoxysilane, vinyltriacetoxysilane, vinyltriethoxysilane, vinyltriisopropoxysilane, vinyltrimethoxysilane, vinyltriphenoxysilane, vinyltri-t-butoxysilane, vinyltris-isobutoxysilane, vinyltriisopropenoxysilane, vinyltris(2-methoxyethoxy)silane, styrylethyltrimethoxysilane, mercaptopropyltrimethoxysilane, 3-glycidoxypropyltrimethoxysilane, acrylic acid, methacrylic acid, oleic acid, stearic acid, dodecanoic acid, 2-[2-(2-methoxyethoxy)ethoxy]acetic acid (MEEAA), beta-carboxyethylacrylate, 2-(2-methoxyethoxy)acetic acid, methoxyphenyl acetic acid, and mixtures of two or more of the foregoing.

Embodiment 39 is the film of any one of embodiments 34 to 38 wherein the nanoparticles are present in an amount of 10 wt-% to 95 wt-%, based on the total weight of the acrylic hardcoat layer.

Embodiment 40 is the film of any one of embodiments 1 to 39 wherein the siliceous primer layer has an average thickness of at least 0.05 micron.

Embodiment 41 is the film of any one of embodiments 1 to 40 wherein the siliceous primer layer has an average thickness of up to 5 microns.

Embodiment 42 is the film of any one of embodiments 1 to 41 wherein the siliceous primer layer comprises composite particles comprising an organic polymer portion and a siliceous portion.

Embodiment 43 is the film of embodiment 42 wherein the composite particles comprise organic polymer core particles having a siliceous shell thereon.

Embodiment 44 is the film of embodiment 42 or 43 wherein the siliceous portion (e.g., shell) comprises a silicate coating.

Embodiment 45 is the film of embodiment 44 wherein the silicate coating comprises lithium silicate, sodium silicate, potassium silicate, or a combination thereof.

Embodiment 46 is the film of embodiment 44 or 45 wherein the composite particles comprise one or more metal silicates in an amount of at least 45 wt-%, based on the total weight of the composite particles.

Embodiment 47 is the film of any one of embodiments 44 to 46 wherein the composite particles comprise one or more metal silicates in an amount of up to 98 wt-%, based on the total weight of the composite particles.

Embodiment 48 is the film of embodiment 42 or 43 wherein the siliceous portion (e.g., shell) comprises silica particles.

Embodiment 49 is the film of embodiment 48 wherein the organic polymer core particles have a mean particle diameter ($D_{50}$) that is at least 3 times greater than the mean particle diameter ($D_{50}$) of the silica particles.

Embodiment 50 is the film of embodiment 48 or 49 wherein the silica particles have a mean particle diameter of 100 nm or less.

Embodiment 51 is the film of any one of embodiments 48 to 50 wherein the weight ratio of the silica particles to the organic polymer core particles is in a range of from 30:70 to 97:3.

Embodiment 52 is the film of any one of embodiments 48 to 51 wherein the silica particles comprise organo-modified silica particles.

Embodiment 53 is the film of embodiment 52 wherein the organo-modified silica particles are prepared from a hydrolyzable organosilicate and a hydrolyzable organosilane represented by Formula (IV):

wherein:
$R^3$ represents a monovalent organic group;
each $R^4$ independently represents H, an alkyl group having from 1 to 4 carbon atoms, or an acyl group having from 1 to 4 carbon atoms.

Embodiment 54 is the film of any one of embodiments 48 to 51 wherein the silica particles comprise unmodified nonporous spherical silica particles.

Embodiment 55 is the film of any one of embodiments 42 to 54 wherein siliceous portion and. organic polymer portion are present in a weight ratio range or 0.1 to 19 (the total amount of the silica in the composite particles corresponding to the theoretical amount of SiO$_2$ (prior to any pyrolysis to remove organic groups) to the total amount of the at least one polymer in the composite particles).

Embodiment 56 is the film of any one of embodiments 42 to 55 wherein the composite particles have an average particle size of from 60 nm to 250 nm.

Embodiment 57 is the film of any one of embodiments 42 to 56 wherein the organic polymer portion is non-cationic.

Embodiment 58 is the film of any one of embodiments 42 to 57 wherein the organic polymer portion comprises latex particles.

Embodiment 59 is the film of embodiment 58 wherein the latex particles have a particle size in a range of 5 nm to 250 nm.

Embodiment 60 is the film of any one of embodiments 42 to 59 wherein the organic polymer portion comprises one or more polymers selected from the group of acrylic polymers, styrenic polymers, vinyl acetate-ethylene copolymers, polyvinyl acetate, styrene-butadiene rubbers, polyurethanes (including urethane-acrylic polymers), polyesters, polyamides, and combinations thereof.

Embodiment 61 is the film of any one of embodiments 40 to 60 wherein the siliceous primer layer is applied from an aqueous primer coating composition having a pH of 5 or less.

Embodiment 62 is the film of embodiment 61 wherein the aqueous primer coating composition further includes at least one of an organic orthosilicate or a partially hydrolyzed oligomer thereof.

Embodiment 63 is the film of embodiment 61 or 62 wherein the aqueous primer coating composition further includes a hydrolyzable organosilane according to Formula (IV):

R$^3$Si(OR$^4$)$_3$ (IV)

wherein:
R$^3$ represents a monovalent organic group;
each R$^4$ independently represents H, an alkyl group having from 1 to 4 carbon atoms, or an acyl group having from 1 to 4 carbon atoms.

Embodiment 64 is the film of embodiment 63 wherein the hydrolyzable organosilane is present in the aqueous primer coating composition in an amount of 1 wt-% to 10 wt-%, based on the total weight of the primer coating composition.

Embodiment 65 is the film of any one of embodiments 61 to 64 wherein the aqueous primer coating composition further includes polyvalent metal cations having a positive charge of at least +2 charge.

Embodiment 66 is the film of embodiment 65 wherein the polyvalent metal cations are selected from the group of aluminum (+3), titanium (+4), vanadium (+3, +4, +5), manganese (+2, +3), zinc (+2), tin (+2, +4), and combinations thereof.

Embodiment 67 is the film of embodiment 65 or 66 wherein the polyvalent metal cations are present in the aqueous primer coating composition in an amount of 0.1 wt-% to 5 wt-%, based on the total weight of the primer coating composition, prior to purification.

Embodiment 68 is the film of any one of embodiments 61 to 67 wherein the aqueous primer coating compositions has a solids content of at least 0.1 wt-%, based on the total weight of the primer coating composition.

Embodiment 69 is the film of any one of embodiments 61 to 68 wherein the aqueous primer coating composition has a solids content of up to 15 wt-%, based on the total weight of the primer coating composition.

Embodiment 70 is the film of any one of embodiments 61 to 69 wherein the aqueous primer coating composition comprises volatile organic solvents in an amount of less than 0.1 wt-%, based on the total weight of the aqueous continuous liquid phase.

Embodiment 71 is the film of any one of embodiments 61 to 70 wherein the aqueous primer coating composition is applied in a uniform average wet thickness varying from 0.5 micron to 50 microns.

Embodiment 72 is the film of any one of embodiments 61 to 71 wherein the aqueous primer coating composition further comprises one or more epoxy-functional compounds of Formulas (V), (VI), (VII), and (VIII):

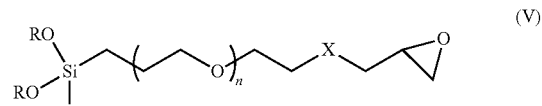

(V)

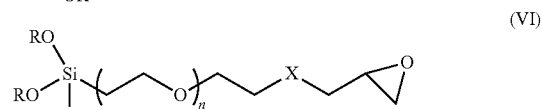

(VI)

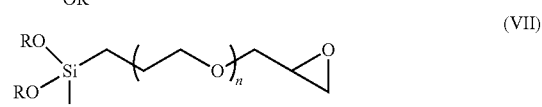

(VII)

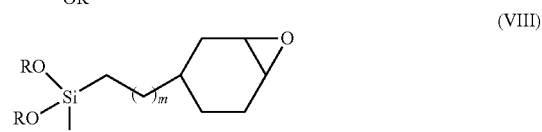

(VIII)

wherein:
each R is independently H, —CH$_3$, —C$_2$H$_5$, —C$_3$H$_7$, or —C$_4$H$_9$;
X=CH$_2$, O, S, or NHC(O)R$^1$;
each R$^1$ is independently —C$_2$H$_5$, —C$_3$H$_7$, or —C$_4$H$_9$;
n=0 to 10; and
m=1 to 4.

EXAMPLES

Objects and advantages of various embodiments of this invention are further illustrated by the following examples, but the particular materials and amounts thereof recited in these examples, as well as other conditions and details, should not be construed to unduly limit this invention. These examples are merely for illustrative purposes only and are not meant to be limiting on the scope of the appended claims.

Unless otherwise noted, all parts, percentages, ratios, etc. in the Examples and the rest of the specification are by weight. Unless otherwise noted, all chemicals used in the examples can be obtained from general chemical suppliers such as, for example, Sigma-Aldrich Corp., Saint Louis, Mo. In the examples, "wt-%" refers to weight percent, "mmol" refers to millimole, and "mol" refers to mole.

Materials

| Abbreviation | Description; Tradename; | Vendor |
|---|---|---|
| NALCO 1115 | Colloidal silica sol, 16.6 wt-%; "NALCO 1115" | Obtained from Nalco Corp., Naperville, Illinois |
| LSS-35 | Lithium silicate, 23 wt-%; "LSS-35" | Obtained from Nissan Chemical America Corp., Houston, Texas |
| LSS-75 | Lithium silicate, 22 wt-%; "LSS-75" | Obtained from Nissan Chemical America Corp., Houston, Texas |
| $Al(NO_3)_3 \cdot 9H_2O$ | Aluminum nitrate 9-hydrate, MW: 375.13 | Obtained from J. T. Baker, Center Valley, Pennsylvania |
| 3-Amino-1-propanol | 3-Amino-1-propanol; 3-Aminopropyl alcohol, MW: 75.11 | Obtained from Aldrich Chemical Company, Milwaukee, Wisconsin |
| Epoxy silane | (3-Glycidoxypropyl)trimethoxysilane, 97 wt-%; MW: 236.34 | Obtained from Alfa-Aesar, Ward Hill, Massachusetts |
| TEOS | Tetraethyl orthosilicate | Obtained from Aldrich Chemical Company, Milwaukee, Wisconsin |
| Methyl triethoxysilane | Methyl triethoxysilane, 99%, MW = 178.30 | Obtained from Aldrich Chemical Company, Milwaukee, Wisconsin |
| ZS | Zwitterionic silane, 43 wt-% in water (structure shown) | Prepared according to the teachings of U.S. Pat. No. 9,340,683 (Jing et al.) |
| $HNO_3$ | Nitric acid, 68-70 wt-% | Obtained from BDH, Radnor, Pennsylvania |
| R966 | 33 wt-% emulsion of an aliphatic urethane in water; "NEOREZ R966" | Obtained from DSM Coating Resins, LLC, Augusta, Georgia |
| Ion-exchange resin | Ion exchange resin, H-form; "AMBERLITE IR120" | Obtained from Aldrich Chemical Company, Milwaukee, Wisconsin |
| PET film with Hard Coat 1 | White 7-mil (178-micrometer) thick polyethylene terephthalate (PET) coated with 3 micrometer hard coat (SR444/NALCO 2327/A174 = 31/53/16) | Prepared as described below |
| PET film with Hard Coat 2 | White 7-mil (178-micrometer) thick PET coated with 3 micrometer hard coat (SR444/A174 = 75/25) | Prepared as described below |
| PET film with Hard Coat 3 | White 7-mil (178-micrometer) thick PET coated with 3 micrometer hard coat (SR444/NALCO 2327/A174 =30/50/20) | Prepared as described below |
| MITSUBISHI film | White 7-mil (178-micrometer) thick PET film; "HOSTAPHAN W54B" | Obtained from Mitsubishi Polyester Film, Inc., Greer, South Carolina |
| SR351LV | A low viscosity version of trimethylolpropane triacrylate (TMPTA); "SR351LV" | Obtained from Sartomer Americas, Exton, Pennsylvania |
| MeFBSEA | $C_4F_9SO_2NMeC_2H_4OC(O)CH=CH_2$ | Prepared according to the teachings of U.S. Pat. No. 2,803,615 (Ahlbrecht et al.) |
| ESACURE ONE | Difunctional alpha hydroxyketone, a photoinitiator; "ESACURE ONE" | Obtained from Lamberti, Hungerford, Texas |
| SR444 | Pentaerythritol triacrylate; "SR 444" | Obtained from Sartomer Americas, Exton, Pennsylvania |
| NALCO 2327 | Colloidal silica sol; "NALCO 2327" | Obtained from Nalco Corporation, Naperville, Illinois |
| A174 | Gamma-Methacryloxypropyltrimethoxysilane; "SILQUEST A 174" | Obtained from Momentive Performance Materials, Waterford, New York |

Methods

Preparation of Control Film

The control film comprising a hard coat was prepared using a coating formulation comprising SR351LV/MeFB-SEA/ESACURE ONE in a weight ratio of 95/2.5/2.5 in ethyl acetate solvent onto a 7-mil (178-micrometer) white PET film (obtained from Mitsubishi Polyester Film, Inc., Greer, S.C., under tradename "HOSTAPHAN W54B") by a reverse gravure coating method. The wet coating was dried at 60° C. for 30 seconds by passing the coated film through an oven and subsequently curing the coating composition by passing it through a UV station (obtained from Haraeus Noblelight America, LLC, Gaithersburg, Md.) equipped with a 300 W H-bulb with average UVC energy output of 60 milliJoules (mJ). The coated film was passed through the UV curing system at a rate of 20 feet per minute (fpm) (approximately 6.1 meters per minute (m/min)) speed. The UV lamp was placed about 1 inch (2.5 centimeters (cm)) above the coated film. The thickness of the resulting hard coat was about 3 micrometers.

The roll of hard coated film from above was coated with diamond-like glass (DLG) using a roll-to-roll plasma reactor according to the teachings of U.S. Pat. No. 6,696,157 (David et al.). The DLG-coated film was subsequently coated with a 1 wt-% zwitterionic silane solution (diluted from 50 wt-% solution) using a Meyer #3 bar. The coating was thermally cured at 280° F. (138° C.) with average oven resident time of 1 min.

Preparation of Hard Coated Substrate Films

A hard coated substrate was prepared by coating a hard coat formulation comprising SR444/Nalco 2327/A174=30/50/15 in a weight ratio of=30/50/15 in ethyl acetate solvent onto a 7-mil (178-micrometer) white PET film (obtained from Mitsubishi Polyester Film, Inc., Greer, S.C., under tradename "HOSTAPHAN W54B") by a reverse gravure coating method. The wet coating was dried at 60° C. for 30 seconds by passing the coated film through an oven and subsequently curing the coating composition by passing it through a UV station (obtained from Haraeus Noblelight America, LLC, Gaithersburg, Md.) equipped with a 300 W H-bulb with average UVC energy output of 60 mJ. The coated film was passed through the UV curing system at a rate of 20 fpm (approximately 6.1 m/min) speed. The UV lamp was placed about 1 inch (2.5 cm) above the coated film. The thickness of the resulting hard coat was about 3 micrometers.

Other hard-coated substrates with varying hard-coat formulations were formed in the same manner except by varying the coating formulations.

Preparation of Primer Coating Solution-I

This preparation method is exemplified for primer solution having a composition of "LSS-75/R966 (8/2 weight ratio), 10 wt-% epoxy silane, 10 wt-% Al(NO$_3$)$_3$, 10 wt-% TEOS."

To prepare the primer coating solution, first, lithium silicate (LSS-75, 23 wt-%) was diluted with deionized (DI) water to 10 wt-%. Then, R966 (33 wt-%) was diluted to 10 wt-% using DI water.

Into an 8-ounce (237-milliliter (mL)) bottle was placed 80 grams (g) of LSS-75 (10 wt-%) and 20 g of R966 (10 wt-%). While the mixture was stirred using a magnetic stirrer, an ion exchange resin (AMBERLITE IR120, 25 g) was added. Once the pH of the solution reached about 4.2-5.0, the solution was poured into a funnel fitted with a piece of CONTEC PNHS-99 POLYNIT CLOTH (from CONTEC Inc., Spartanburg, S.C.) on top of a piece of WHATMAN Grade 4 filter paper. The resin on the cloth was squeezed to obtain the remainder of the suspension solution. A sample of 80 g of filtrate was collected. The filtrate was further acidified by adding 4 drops of HNO$_3$ (concentrated) to adjust the solution pH to 1.6-2.0. Then, 0.80 g of (3-glycidoxypropyl) trimethoxysilane was added to the solution. The mixture was stirred for 20 minutes. A sample of 45 g of the dispersion was weighed into a 4-ounce (119-mL) bottle and 5 g of 10 wt-% Al(NO$_3$)$_3$ was added and mixed well by stirring. To the mixture was added 0.761 g of TEOS and 4.24 g of DI water. The mixture was stirred for 2 hours.

Other primer coating solution compositions were prepared in essentially the same manner except by varying the relative amounts of the components.

Preparation of Primer Coating Solution-II

In an 8-oz. (237 mL) glass jar, 89 grams (g) of DI water and 1 g of 3-amino-1-propanol was mixed homogenously, and then 10 g of TEOS was added. The mixture was vigorously stirred for 1-2 hours until it become a homogenous clear solution forming a colloidal silica particle dispersion. Then, 5.0 wt-% of methyl triethoxysilane with respect to the total weight of TEOS was added into a 100 grams colloidal silica particle dispersion prepared above to prepare the functional silica particle dispersion. The dispersion was stirred for 3-24 hours before use. The final solutions were filtered through a Whatman Grade 4 filter paper to remove clumps before use when deemed necessary. The final solution had a pH value around 10.4±0.2.

Functional silica particle dispersions prepared with ammonium hydroxide solution (28-30%) or n-butylamine were conducted in a similar manner as described above. The final solutions were clear with pH values in a range of 9-11.

Into an 8-oz. (237 mL) container was placed 80 g of the above functional colloidal silica particle dispersion (close to 3.0 wt-% methyl triethoxysilane modified nanosilica particle after completed conversion of TEOS (MW=208.3) to silica particles (MW=60, with an average diameter of 1.6 nm), prepared as described above, and 20 g of 3 wt-% R966 latex (prepared by the dilution of 33 wt-% of original R966 latex with DI water) while the solution was stirred. The mixed solution was added 15-20 g of ion-exchange resin (AMBERLITE IR120), and the solution was stirred for 10-20 minutes. The ion-exchange resin was removed by filtration and the solution pH was about 4-5. Nitric acid was added to adjust the solution pH value to 2-4 to obtain the composite particle dispersion having a ratio of R966:silica that is equal to 20:80. Finally, 0.5-1.0 gram of 3-glycidoxypropyltrimethoxysilane was added into the composite particle dispersion and the final primer coating solution was stirred for at least 30 minutes.

In the same manner, primer coatings with different ratios of silica:polymer latex were prepared by adjusting the amounts of colloidal silica particle dispersion and polymer latex.

After preparing the primer coating solution, 5-10 grams of aluminum nitrate aqueous solution (20 wt-% Al(NO$_3$)$_3$.9H$_2$O), in some cases, zinc acetate aqueous solution (20 wt. % Zn(O$_2$CCH$_3$)$_2$(H$_2$O)$_2$) or zirconyl chloride aqueous solution (20 wt-% ZrOCl$_2$.8H$_2$O) was added into the solution before use.

Preparation of ZS/TEOS (8/2, 3 wt-%) Topcoat Solution

A sample of 0.185 g of TEOS was weighed into a 20-mL vial. To the vial was added 16.0 g of 3 wt-% zwitterionic silane salt solution, and the total weight was adjusted to 20.0 g using DI water. The mixture was stirred vigorously for 30 minutes, after which the mixture was stirred gently for 2.5 hours.

Preparation of Hydrophilic Films

A 7-mil (178-micrometer) thick MITSUBISHI white film coated with an acrylic hard coat (prepared as described above in "Preparation of Hard Coated Substrate Films") was used as the substrate unless otherwise stated. First, the primer layer was coated using a #6 Meyer bar and the film was heated at 140° C. for 10 minutes. Then, the topcoat layer (ZS/TEOS) was coated using a Meyer #3 bar and the coated film was heated at 140° C. for 3 minutes.

Soaking (Water Resistance) Test Method

Samples prepared according to the Examples described below (including a hard coated substrate, a primer layer, and a topcoat layer) were tested. A 1-inch (2.5-cm) wide strip of the sample film was immersed in a beaker containing DI water overnight (or for a duration as indicated below), and the water in the beaker was continuously replaced by a very slow stream of water flow. The film was taken out of the beaker after soaking and blow dried with a compressed air gun. A continuous zig-zag band (2-cm wide, 7-cm long) of a permanent marking was made on the film using a SHARPIE PERMANENT MARKER and dried with compressed air for 5 seconds. The performance of the coated film was evaluated against a standard control (prepared as described above in "Preparation of Control Film") for ease of "rinse-off," "easy-clean" rating, and "ghosting." The comparisons were semi-quantitative. The "rinse-off" rating involved estimating the percentage of the permanent marking "rinsed-off" by spraying water on it until no further permanent marking come off.

"Easy-clean" rating was based on the easiness of removing the permanent marks using a wet paper towel (the control sample being rated a "5," which is the easiest to clean off, and a white PET film sample being rated a "1," which shows no removal of permanent marks). The rating was determined as follows.

| Permanent removal | Ranking |
| --- | --- |
| Easiest (water rinse) | 5 |
| Very Easy | 4 |
| Easy | 3 |
| Fair | 2 |
| No removal | 1 |

Ghosting was defined as the severity of mark remaining after cleaning (the control sample being "5," and an as-received MITSUBISHI film sample being rated a "1," which shows heavy ghosting) as follows.

| Ghosting | Rank |
| --- | --- |
| Free | 5 |
| Difficult to see | 4 |
| Very light | 3 |
| Obvious | 2 |
| Heavy | 1 |

Dry Abrasion Test Method

A 1.5-inch (3.8-cm) wide strip of the film was abraded under the weight of 15 Newtons (N) for 3500 cycles at 75 strokes/minute with a stroke length of 1.5 inches (3.8 cm) using a plate covered with a blue pad available from 3M Co. under the tradename SCOTCH-BRITE. A Taber Industries 5900 Reciprocating Abraser (form Taber Industries, North Tonawanda, N.Y.) was used. After the abrasion test, the film was rinsed with DI water for 20 seconds and blow dried with a compressed air gun. A continuous zig-zag band (2-cm wide, 8-cm long) of a permanent marking was made on the film using a SHARPIE PERMANENT MARKER and dried with compressed air for 5 seconds, or separately the permanent marks were dried at room temperature for 24 hours. The performance of the coated film was evaluated against the control film for ease of "rinse-off," "easy-clean" rating, and "ghosting" in the same manner as described above for the "Soaking (Water Resistance) Test Method." In addition, the samples were evaluated for scratch resistance which measured the severity of damage caused by the abrasion (5 means no scratches and 1 means severe scratches).

Wet Abrasion Test Method

A 1.5-inch (3.8-cm) wide strip of the film was abraded under the weight of 5N for 3000 cycles at 75 strokes/minute with a stroke length of 1.5 inches (3.8 cm) using a plate covered with a blue pad available from 3M Co. under the tradename SCOTCH-BRITE (at the beginning of the abrasion and at 20 minutes into the abrasion, the pad was wetted with plenty of DI water). A Taber Industries 5900 Reciprocating Abraser (form Taber Industries, North Tonawanda, N.Y.) was used. After the abrasion test, the film was rinsed with DI water for 20 seconds and blow dried with a compressed air gun. A continuous zig-zag band (2-cm wide, 8-cm long) of permanent marking was made on the film using a SHARPIE PERMANENT MARKER and dried with compressed air for 5 seconds, or separately the permanent marks were dried at room temperature for 24 hours. The performance of the coated film was evaluated against the control film for ease of "rinse-off," "easy-clean" rating, and "ghosting" in the same manner as described above for the "Soaking (Water Resistance) Test Method." In addition, the samples were evaluated for scratch resistance, which measured the severity of damage caused by the abrasion (5 means no scratches and 1 means severe scratches).

Aging Test Method

The above soaking and abrasion tests were carried out after the film was coated with primer solutions and topcoat solutions after aging for different lengths of time.

Primer Formulation Stability Test Method

The stability of primer coating solutions was determined empirically by visual judgement of the viscosity of the solutions. The coating solutions that included LSS-75/R966 core-shell nanoparticle formulations of 5 wt-% and 10 wt-% solid content was generally stable (i.e., primer solutions remained the same after 3 days aging at room temperature). The primer solution stability of the formulations appeared to be dependent on the amount of epoxy silane used in the solution preparation. For example, primer solutions with 2.5 wt-% epoxy silane were stable for up to 2 days. With an increase of the epoxy silane content to 5 wt-%, the resulting primer solutions were stable for up to a week. A primer solution with 10 wt-% epoxy silane remained stable for months.

Examples 1-11

Effect of Amount of TEOS in Primer Coating Solution

Examples 1-11 were prepared using the methods described above for preparing hydrophilic films in the "Preparation of Hydrophilic Films" method. The topcoat layer was formed from the solution prepared as described above in the "Preparation of ZS/TEOS (8/2, 3 wt-%) Topcoat Solution" method. The primer layer was formed from the primer coating solution prepared as described above in "Preparation of Primer Coating Solution-I" method. PET film with Hard Coat 1 was the substrate used. The composition of the primer coating solution was varied as described in Table 1, below. The samples were tested as described above and the results are summarized in Table 1A, below.

Examples 12-17

Comparison of Primer Solutions at Different Solids Contents

Examples 12-17 were prepared using the methods described above for preparing hydrophilic films in the "Preparation of Hydrophilic Films" method. The topcoat layer was formed from the solution prepared as described above in the "Preparation of ZS/TEOS (8/2, 3 wt-%) Topcoat Solution" method. The primer layer was formed from the primer coating solution prepared as described above in "Preparation of Primer Coating Solution-I" method. PET film with Hard Coat 1 was the substrate used. The composition of the primer coating solution (i.e., the solids content of the primer coating solution and the presence or absence of 10 wt-% of TEOS) was varied as described in Table 2, below. The samples were tested as described above and the results are summarized in Table 2, below.

Examples 18-23

Comparison of Primer Solutions Having Different LSS-75/R966 Ratios

Examples 18-23 were prepared using the methods described above for preparing hydrophilic films in the "Preparation of Hydrophilic Films" method. The topcoat layer was formed from the solution prepared as described above in the "Preparation of ZS/TEOS (8/2, 3 wt-%) Topcoat Solution" method. The primer layer was formed from the primer coating solution prepared as described above in the "Preparation of Primer Coating Solution-I" method. PET film with Hard Coat 1 was the substrate used. The composition of the primer coating solution (i.e., the ratio of LSS-75/R966 and the presence or absence of 10 wt-% of TEOS) was varied as described in Table 3, below. The samples were tested as described above and the results are summarized in Table 3, below.

The films of Examples 19 and 21 were tested again using the "Dry Abrasion Test Method" and "Wet Abrasion Test Method" described above after the samples were dry aged for 1 day as described above in the "Aging Test Method." The test data is summarized in Table 3A and Table 3B, respectively, below.

Examples 19 and 21 samples were tested again after the samples (dry aged for 1 day) were subjected to the water resistance test for 1 day as described above in the "Soaking (Water Resistance) Test Method." The test data is summarized in Table 3C, below.

Examples 24-27

Comparison of Primer Solutions after Aging the Primer Solutions

Examples 24-27 were prepared using the methods described above for preparing hydrophilic films in the "Preparation of Hydrophilic Films." method. The topcoat layer was formed from the solution prepared as described above in the "Preparation of ZS/TEOS (8/2, 3 wt-%) Topcoat Solution" method. The primer layer was formed from primer coating solution prepared as described above in the "Preparation of Primer Coating Solution-I" method. PET film with Hard Coat 1 was the substrate used.

Example 24 was prepared using freshly prepared primer coating solution. Examples 25-27 were prepared using primer coating solutions aged for 6, 8, and 10 days, respectively. The resulting samples were tested as described above and the results are summarized in Table 4, below.

Examples 28-30

Examples 28-30 were prepared using the methods described above for preparing hydrophilic films in the "Preparation of Hydrophilic Films" Method. The hard coated substrate was varied. The topcoat layer was formed from the solution prepared as described above in the "Preparation of ZS/TEOS (8/2, 3 wt-%) Topcoat Solution" method. The primer layer was formed from primer coating solution prepared as described above in the "Preparation of Primer Coating Solution-I" method.

Examples 28-30 samples were tested and the results are summarized in Table 5, below.

Example 31

Example 31 was prepared using the methods described above for preparing hydrophilic films in the "Preparation of Hydrophilic Films" method. The topcoat layer was formed from the solution prepared as described above in the "Preparation of ZS/TEOS (8/2, 3 wt-%) Topcoat Solution" method. The primer layer was formed from the primer coating solution prepared as described above in "Preparation of Primer Coating Solution-II" method: functional silica particle dispersion was prepared by using 3-amino-1-propanol as described, the weight ratio between R966 and silica was 20 to 80 in the primer coating solution, and aluminum nitrate was introduced into the primer coating solution. PET film with Hard Coat 1 was the substrate used. The sample was tested as described above and the results are summarized in Table 6, below.

TABLE 1

| Composition of primer coating solution | | | |
|---|---|---|---|
| Top layer coating solution | Primer | TEOS (wt-% with respect to total solids content in primer coating solution) | Example |
| ZS/TEOS (8/2, 3 wt-%) | LSS-75/R966 (8/2) | 0 | 1 |
| | 5 wt-%, epoxy silane | 10 | 2 |
| | 5 wt-%, Al(NO$_3$)$_3$ 10 wt-% | | |
| | LSS-75/R966 (8/2) | 0 | 3 |
| | 5 wt-%, epoxy silane | 10 | 4 |
| | 10 wt-%, Al(NO$_3$)$_3$ | 20 | 5 |
| | 10 wt-% | 5 | 6 |
| | LSS-75/R966 (8/2) | 0 | 7 |
| | 10 wt-%, epoxy silane | 10(A) | 8 |
| | 2.5 wt-%, Al(NO$_3$)$_3$ 10 wt-% | | |
| | LSS-75/R966 (8/2) | 0 | 9 |
| | 10 wt-%, epoxy silane | 10(B) | 10 |
| | 5 wt-%, Al(NO$_3$)$_3$ 10 wt-% | | |
| | A + B | | 11 |

TABLE 1A

| Example | After 4 day soaking | | | Wet abrasion, 3000 cycles/5N | | | | Dry abrasion, 3500 cycles/15N | | | |
|---|---|---|---|---|---|---|---|---|---|---|---|
| | Rinse-off (%) | Easy-clean rating | Ghosting marks | Scratches | Rinse-off (%) | Easy-clean rating | Ghosting marks | Scratches | Rinse-off (%) | Easy-clean rating | Ghosting marks |
| 1 | 50 | 4 | 5 | 5 | 70 | 4 | 5 | 4 | 0 | 4 | 5 |
| 2 | 40-50 | 4 | 5 | 5 | 40-50 | 4 | 5 | 4 | 0 | 3 | 5 |
| 3 | 40 | 4 | 5 | 5 | 40 | 4 | 5 | 4 | 5-10 | 4 | 5 |
| 4 | 30-40 | 4 | 5 | 5 | 30 | 4 | 5 | 4 | 10 | 3 | 5 |
| 5 | 25 | 4 | 5 | 4 | 30 | 3 | 4 | 4 | 10 | 4 | 5 |
| 6 | 50 | 4 | 5 | 5 | 40 | 4 | 5 | 4 | 10 | 3 | 5 |
| 7 | 70 | 4 | 5 | 5 | 70 | 4 | 5 | 4 | 5-10 | 4 | 5 |
| 8 | 70 | 4 | 5 | 5 | 60 | 4 | 4 | 4 | 5-10 | 3 | 5 |
| 9 | 50-60 | 4 | 5 | 5 | 70 | 4 | 5 | 4 | 10 | 4 | 5 |
| 10 | 60-70 | 4 | 5 | 5 | 60-70 | 4 | 4 | 4 | 20 | 4 | 5 |
| 11 | 60 | 4 | 5 | 4 | 30 | 4 | 4 | 4 | 10 | 4 | 5 |
| Control | 90 | 5 | 5 | 5 | 90 | 5 | 5 | 4 | 70 | 4 | 5 |

TABLE 2

| Example | Solids content of Primer coating solution, amount of TEOS | Dry abrasion (3500/15N) | | | | Wet abrasion (3000/5N) | | | | Soaking (overnight) | | |
|---|---|---|---|---|---|---|---|---|---|---|---|---|
| | | Scratches | Rinse-off (%) | Easy-clean | Ghosting | Scratches | Rinse-off (%) | Easy-clean | Ghosting | Rinse-off (%) | Easy-clean | Ghosting |
| 12 | 5 wt-%, No TEOS | 4 | 20 | 4 | 5 | 5 | 50 | 4 | 5 | 5 | 3 | 5 |
| 13 | 5% wt-%, TEOS 10 wt-% | 5 | 25 | 4 | 5 | 5 | 40 | 4 | 5 | 5 | 3 | 5 |
| 14 | 7.5 wt-%, No TEOS | 4 | 15 | 4 | 5 | 5 | 0 | 3 | 5 | 0 | 3 | 5 |
| 15 | 7.5 wt-%, TEOS 10 wt-% | 4 | 20 | 4 | 5 | 5 | 5 | 3 | 5 | 0 | 3 | 5 |
| 16 | 10 wt-%, No TEOS | 4 | 30 | 4 | 5 | 5 | 10 | 4 | 5 | 20 | 4 | 5 |
| 17 | 10 wt-%, TEOS 10 wt-% | 4 | 50 | 4 | 5 | 5 | 30 | 4 | 5 | 20 | 4 | 5 |

TABLE 3

| Example | Primer coating solution LSS75/R966 ratio, amount of TEOS | Dry abrasion (3500/15N) | | | | Wet abrasion (3000/5N) | | | | Soaking (overnight) | | |
|---|---|---|---|---|---|---|---|---|---|---|---|---|
| | | Scratches | Rinse-off (%) | Easy-clean | Ghosting | Scratches | Rinse-off (%) | Easy-clean | Ghosting | Rinse-off (%) | Easy-clean | Ghosting |
| 18 | 7/2, No TEOS | 5 | 20 | 4 | 5 | 5 | 25-30 | 4 | 5 | 50 | 4 | 5 |
| 19 | 7/2, TEOS 10 wt-% | 5 | 25 | 4 | 5 | 5 | 30 | 4 | 5 | 70 | 4 | 5 |
| 20 | 8/2, No TEOS | 4 | 25 | 4 | 5 | 5 | 60-70 | 4 | 5 | 70-80 | 4 | 5 |
| 21 | 8/2, TEOS 10 wt-% | 4 | 25 | 4 | 5 | 5 | 40-50 | 4 | 5 | 70-80 | 4 | 5 |
| 22 | 9/2, No TEOS | 4 | 20 | 4 | 4 | 5 | 60 | 4 | 5 | 70 | 4 | 5 |
| 23 | 9/2, TEOS 10 wt-% | 4 | 20 | 4 | 5 | 5 | 30 | 4 | 5 | 80 | 4 | 5 |

TABLE 3A

| Example | Dry abrasion (3500/15N) | | | | | | | |
|---|---|---|---|---|---|---|---|---|
| | Scratches | Scratches aged 1 day | Rinse-off (%) | Rinse-off (%) aged 1 day | Easy-clean | Easy-clean aged 1 day | Ghosting | Ghosting aged 1 day |
| 19 | 5 | 4 | 25 | 20 | 4 | 4 | 5 | 5 |
| 21 | 4 | 4 | 25 | 15 | 4 | 4 | 5 | 5 |

TABLE 3B

| | | | | Wet abrasion (3000/5N) | | | | |
|---|---|---|---|---|---|---|---|---|
| Example | Scratches | Scratches aged 1 day | Rinse-off (%) | Rinse-off (%) aged 1 day | Easy-clean | Easy-clean aged 1 day | Ghosting | Ghosting aged 1 day |
| 19 | 5 | 5 | 30 | 50 | 4 | 4 | 5 | 5 |
| 21 | 5 | 5 | 40-50 | 40 | 4 | 4 | 5 | 5 |

TABLE 3C

| | | | | Water resistance | | | | |
|---|---|---|---|---|---|---|---|---|
| Example | Scratches | Scratches aged 1 day | Rinse-off (%) | Rinse-off (%) aged 1 day | Easy-clean | Easy-clean aged 1 day | Ghosting | Ghosting aged 1 day |
| 19 | 70 | 80 | 4 | 4 | 5 | 5 | 70 | 80 |
| 21 | 70-80 | 75 | 4 | 4 | 5 | 5 | 70-80 | 75 |

TABLE 4

| | Primer coatings | Primer solution | Dry abrasion (3500/15N) | | | |
|---|---|---|---|---|---|---|
| Example | solution composition | aged for (days) | Scratches | Rinse-off (%) | Easy-clean | Ghosting |
| 24 | LSS-75/R966, 8/2, | Fresh | 4 | 5 | 3 | 5 |
| 25 | 10 wt-%, Epoxy silane | 6 | 4 | 50 | 4 | 5 |
| 26 | 10 wt-%, Al(NO₃)₃ | 4 | 15-20 | 4 | 4 | 4 |
| 27 | 10 wt-%, TEOS 10 wt-% | 10 | 4 | 25 | 4 | 4 |

TABLE 5

| | | Dry abrasion (3500/15N) | | | |
|---|---|---|---|---|---|
| Example | Substrate | Scratches | Rinse-off (%) | Easy-clean | Ghosting |
| 28 | PET film with Hard Coat 1 | 4 | 40-50 | 4 | 4 |
| 29 | PET film with Hard Coat 2 | 4 | 40 | 2 | 4 |
| 30 | PET film with Hard Coat 3 | 4 | 80 | 4 | 4 |

TABLE 6

| | After 1 day soaking | | | Wet abrasion, 3000 cycles/5N | | | | Dry abrasion, 3500 cycles/15N | | | |
|---|---|---|---|---|---|---|---|---|---|---|---|
| Example | Rinse-off (%) | Easy-clean rating | Ghosting marks | Scratches | Rinse-off (%) | Easy-clean rating | Ghosting marks | Scratches | Rinse-off (%) | Easy-clean rating | Ghosting marks |
| 31 | 40 | 4 | 5 | 5 | 60 | 4 | 5 | 4 | 0 | 3 | 4 |

The complete disclosures of the patents, patent documents, and publications cited herein are incorporated by reference in their entirety as if each were individually incorporated. To the extent that there is any conflict or discrepancy between this specification as written and the disclosure in any document that is incorporated by reference herein, this specification as written will control. Various modifications and alterations to this disclosure will become apparent to those skilled in the art without departing from the scope and spirit of this disclosure. It should be understood that this disclosure is not intended to be unduly limited by the illustrative embodiments and examples set forth herein and that such examples and embodiments are presented by way of example only with the scope of the disclosure intended to be limited only by the claims set forth herein as follows.

What is claimed is:

1. A film comprising:
    an organic polymeric substrate having a first major surface and a second major surface;
    an optional acrylic hardcoat layer disposed on the first major surface of the substrate;
    a siliceous primer layer disposed on the organic polymeric substrate or on the optional acrylic hardcoat layer, wherein the siliceous primer layer comprises composite particles that are core-shell particles comprising an organic polymer core particle having a siliceous shell comprising (1) a metal silicate coating or (2) organo-modified silica particles; and
    a superhydrophilic surface layer disposed on the siliceous primer layer, wherein the superhydrophilic surface layer comprises hydrophilic-functional groups.

2. The film of claim 1 wherein the acrylic hardcoat layer is disposed on the first major surface of the substrate and the siliceous primer layer is disposed on the acrylic hardcoat layer, the acrylic hardcoat layer comprising alkoxysilyl groups.

3. The film of claim 1 wherein the acrylic hardcoat is prepared from free-radically polymerizable monomers and/or oligomers and alkoxysilyl-containing ethylenically unsaturated monomers.

4. The film of claim 3 wherein the acrylic hardcoat is prepared from 1 wt-% to 30 wt-% alkoxysilyl-containing ethylenically unsaturated monomers, based on the total weight of the polymerizable material.

5. The film of claim 1 wherein the siliceous primer layer has an average thickness of 0.05 micron to 5 microns.

6. The film of claim 1 wherein the siliceous shell of the composite particles comprise one or more metal silicates in an amount of at least 45 wt-% and up to 98 wt-%, based on the total weight of the composite particles.

7. The film of claim 1 wherein the organic polymer core particles have a mean particle diameter ($D_{50}$) that is at least 3 times greater than the mean particle diameter ($D_{50}$) of the organo-modified silica particles.

8. The film of claim 7 wherein the silica particles have a mean particle diameter of 100 nm or less.

9. The film of claim 7 wherein the weight ratio of the organo-modified silica particles to the organic polymer core particles is in a range of from 30:70 to 97:3.

10. The film of claim 1 wherein the siliceous primer layer is applied from an aqueous primer coating composition having a pH of 5 or less.

11. The film of claim 10 wherein the aqueous primer coating composition further includes at least one of an organic orthosilicate or a partially hydrolyzed oligomer thereof.

12. The film of claim 10 wherein the aqueous primer coating composition further comprises a hydrolyzable organosilane according to Formula (IV):

$$R^3Si(OR^4)_3 \qquad (IV)$$

wherein:
$R^3$ represents a monovalent organic group;
each $R^4$ independently represents H, an alkyl group having from 1 to 4 carbon atoms, or an acyl group having from 1 to 4 carbon atoms.

13. The film of claim 12 wherein the hydrolyzable organosilane is present in the aqueous primer coating composition in an amount of 1 wt-% to 10 wt-%, based on the total weight of the primer coating composition.

14. The film of claim 10 wherein the aqueous primer coating composition further includes one or more polyvalent metal cations having a positive charge of at least +2 charge.

15. The film of claim 1 wherein the hydrophilic-functional groups are from hydrophilic-functional compounds that are non-zwitterionic compounds.

16. The film of claim 15 wherein the non-zwitterionic compounds have the following Formulas (IX), (X), (XI), and (XII):

$$[(MO)(Q_n)Si(XSO_3^-)_{3-n}]Y_{2/nr}^{+r} \qquad (IX)$$

$$[(MO)(Q_n)Si(XPO_3H^-)_{3-n}]Y_{2/nr}^{+r} \qquad (X)$$

$$[(MO)(Q_n)Si(XOPO_3H^-)_{3-n}]Y_{2/nr}^{+r} \qquad (XI)$$

$$[(MO)(Q_n)Si(XCO_2^-)_{3-n}]Y_{2/nr}^{+r} \qquad (XII)$$

wherein:
each Q is independently selected from hydroxyl, alkyl groups containing from 1 to 4 carbon atoms, and alkoxy groups containing from 1 to 4 carbon atoms;
M is selected from hydrogen, alkyl groups containing from 1 to 4 carbon atoms, alkali metals, and organic cations of strong organic bases having an average molecular weight of less than 150 and a pKa of greater than 11;
X is an organic linking group;
Y is selected from hydrogen, alkaline earth metals, organic cations of protonated weak bases having an average molecular weight of less than 200 and a pKa of less than 11, alkali metals, and organic cations of strong organic bases having an average molecular weight of less than 150 and a pKa of greater than 11, provided that M is hydrogen when Y is selected from hydrogen, alkaline earth metals, and organic cations of said protonated weak bases;
r is equal to the valence of Y; and
n is 1 or 2.

17. The film of claim 1 wherein the hydrophilic-functional groups are from hydrophilic-functional compounds that are zwitterionic compounds.

18. The film of claim 17 wherein the zwitterionic compounds are selected from compounds having the following Formulas (XIII), (XIV), (XV), and (XVI):

$$(R^1O)_p—Si(R^2)_q—W—N^+(R^3)(R^4)—(CH_2)_m—SO_2^- \qquad (XIII)$$

$$(R^1O)_p—Si(R^2)_q—W—N^+(R^3)(R^4)—(CH_2)_m—PO_3H^- \qquad (XIV)$$

$$(R^1O)_p—Si(R^2)_q—W—N^+(R^3)(R^4)—(CH_2)_m—OPO_3H^- \qquad (XV)$$

$$(R^1O)_p—Si(R^2)_q—W—N^+(R^3)(R^4)—(CH_2)_m—CO_2^- \qquad (XVI)$$

wherein:
each $R^1$ is independently a hydrogen, methyl group, or ethyl group;
each $R^2$ is independently a methyl group or an ethyl group;
each $R^3$ and $R^4$ is independently a saturated or unsaturated, straight chain, branched, or cyclic organic group, which may be joined together, optionally with atoms of the group W, to form a ring;
W is an organic linking group;
p and m are integers of 1 to 4;
q is 0 or 1; and
p+q=3.

19. The film of claim 1 wherein the superhydrophilic surface coating composition further includes a coupling agent.

20. The film of claim 19 wherein the coupling agent is selected from the group of a tetraalkoxysilane compound, an oligomer of a tetraalkoxysilane compound, lithium silicate, sodium silicate, potassium silicate, silica particles, and combinations thereof.

* * * * *